(12) United States Patent
Chen et al.

(10) Patent No.: US 10,928,612 B1
(45) Date of Patent: Feb. 23, 2021

(54) PROJECTION LENS AND PROJECTOR

(71) Applicant: Young Optics Inc., Hsinchu (TW)

(72) Inventors: Kai-Yun Chen, Hsinchu (TW);
Hsin-Te Chen, Hsinchu (TW);
Kuo-Chuan Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 16/690,142

(22) Filed: Nov. 21, 2019

(30) Foreign Application Priority Data

Sep. 6, 2019 (TW) .................................. 108132229

(51) Int. Cl.
| | | |
|---|---|---|
| *G02B 17/08* | (2006.01) | |
| *G02B 13/16* | (2006.01) | |
| *G03B 21/28* | (2006.01) | |
| *G02B 13/18* | (2006.01) | |
| *G02B 13/22* | (2006.01) | |

(52) U.S. Cl.
CPC .............. *G02B 17/08* (2013.01); *G02B 13/16* (2013.01); *G02B 13/18* (2013.01); *G02B 13/22* (2013.01); *G03B 21/28* (2013.01)

(58) Field of Classification Search
CPC ........ G02B 17/08; G02B 13/16; G02B 13/18; G02B 13/22; G03B 21/28; G03B 21/53
See application file for complete search history.

(56) References Cited

U.S. PATENT DOCUMENTS

2015/0029474 A1* 1/2015 Tatsuno ................. G03B 21/14
353/97

FOREIGN PATENT DOCUMENTS

| CN | 103293642 | 9/2013 |
|---|---|---|
| TW | 201516458 | 5/2015 |

* cited by examiner

*Primary Examiner* — Ryan D Howard
(74) *Attorney, Agent, or Firm* — JCIPRNET

(57) ABSTRACT

A projection lens includes a first lens, a second lens, an aperture stop, a third lens, a fourth lens, a fifth lens, a sixth, and a concave mirror sequentially arranged from a minified side to a magnified side. An outer diameter of the second lens is less than an outer diameter of the first lens. An outer diameter of the fifth lens is greater than that of the fourth lens. An outer diameter of the sixth lens is less than that of the fifth lens. The first lens, the second lens, the aperture stop, and the third lens are fixed relative to the concave mirror and the fourth lens is capable of moving along an optical axis relative to the concave mirror when the projection lens is in focusing. The projection lens includes 9 to 30 lenses with refractive power. A projector using said projection lens is also provided.

24 Claims, 16 Drawing Sheets

PROJECTION LENS AND PROJECTOR

CROSS-REFERENCE TO RELATED APPLICATION

This application claims the priority benefit of Taiwan application serial no. 108132229, filed on Sep. 6, 2019. The entirety of the above-mentioned patent application is hereby incorporated by reference herein and made a part of this specification.

BACKGROUND OF THE INVENTION

1. Field of the Invention

The invention relates to an optical lens and an optical apparatus, and in particular, to a projection lens and a projector that perform a plurality of times of imaging.

2. Description of Related Art

In comparison to a TV, a projector can project a large-size image without using too much space, and therefore the projector occupies a certain proportion in the market.

Generally, if the projector is to be projected onto a relatively large screen, a relatively long projection distance is required. Oppositely, in order to project a large-size picture within a relatively short projection distance, a special wide-angle lens including a reflector is used to reduce the distance required for projection. However, in the current design, in order to effectively reduce lens distortion and chromatic aberration, more lenses are generally needed to correct the foregoing error. Nevertheless, an increased lens has an excessive volume of the lens and requires excessively high costs, so those skilled in the art shall be still committed to taking into account the volume of the lens, costs, and an optical effect.

SUMMARY OF THE INVENTION

A category of the invention provides a projection lens and a projector, including a concave reflector, which may allow a light ray emitted from a light valve to pass through an optical axis three times and generate three times of imaging, and has relatively good optical quality under requirements of a big aperture, low distortion, and low chromatic aberration.

An embodiment of the invention proposes a projection lens, including a first lens, a second lens, an aperture stop, a third lens, a fourth lens, a fifth lens, a sixth lens, and a concave mirror that are sequentially arranged from a minified side to a magnified side. The first lens is a lens closest to the minified side in the projection lens. An outer diameter of the second lens is less than an outer diameter of the first lens. An outer diameter of the fifth lens is greater than an outer diameter of the fourth lens. The sixth lens is a lens closest to the magnified side in the projection lens. An outer diameter of the sixth lens is less than the outer diameter of the fifth lens. When the projection lens is focusing, locations of the first lens, the second lens, the aperture stop, and the third lens are fixed relative to the concave mirror, and the fourth lens is capable of moving along an optical axis relative to the concave mirror. The projection lens includes 9 to 30 lenses with refractive power.

An embodiment of the invention proposes a projection lens, including a first lens group, a second lens group, and a concave mirror that are sequentially arranged from a minified side to a magnified side. The first lens group includes a first lens, a second lens, an aperture stop, and a third lens that are sequentially arranged from the minified side to the magnified side. The first lens is a lens closest to the minified side in the first lens group. The first lens is an aspheric lens, and an outer diameter of the first lens is greater than an outer diameter of the second lens. The second lens group includes a fourth lens, a fifth lens, and a sixth lens that are sequentially arranged from the minified side to the magnified side. The fourth lens is a lens closest to the minified side in the second lens group. The sixth lens is a lens closest to the magnified side in the second lens group. An outer diameter of the fifth lens is greater than outer diameters of the fourth lens and the sixth lens. When the projection lens is focusing, a position of the first lens group relative to the concave mirror is fixed, and the second lens group is capable of moving along the optical axis. The projection lens includes 9 to 30 lenses with refractive power.

An embodiment of the invention proposes a projector, including a light source, a light valve, a projection lens, a first lens group, a second lens group, and a concave mirror. The light valve is disposed downstream of a light path of the light source. The projection lens is disposed downstream of the light path of the light valve, including the first lens group, the second lens group, and the concave mirror that are sequentially arranged from a minified side to a magnified side. The first lens group includes a first lens, a second lens, an aperture stop, and a third lens that are sequentially arranged from the minified side to the magnified side. The first lens is a lens closest to the minified side in the first lens group. An outer diameter of the first lens is greater than an outer diameter of the second lens, the outer diameter of the first lens being twice or more of a diagonal length of a reaction surface of the light valve. The second lens group includes a fourth lens, a fifth lens, and a sixth lens that are sequentially arranged from the minified side to the magnified side. The fourth lens is a lens closest to the minified side in the second lens group. The sixth lens is a lens closest to the magnified side in the second lens group. An outer diameter of the fifth lens is greater than outer diameters of the fourth lens and the sixth lens. When the projection lens is focusing, a position of the first lens group relative to the concave mirror is fixed, and the second lens group is capable of moving along the optical axis relative to the concave mirror. The projection lens includes 9 to 30 lenses with refractive power.

Based on the foregoing, the projection lens and the projector applying the projection lens in an embodiment of the invention may allow the light beam emitted by the light valve to pass through the optical axis three times and generate three times of imaging, and has relatively good optical quality under the requirements of a large aperture, low distortion, and low chromatic aberration.

In order to make the aforementioned and other objectives and advantages of the present invention comprehensible, embodiments accompanied with figures are described in detail below.

DESCRIPTION OF THE EMBODIMENTS

Figure 1:
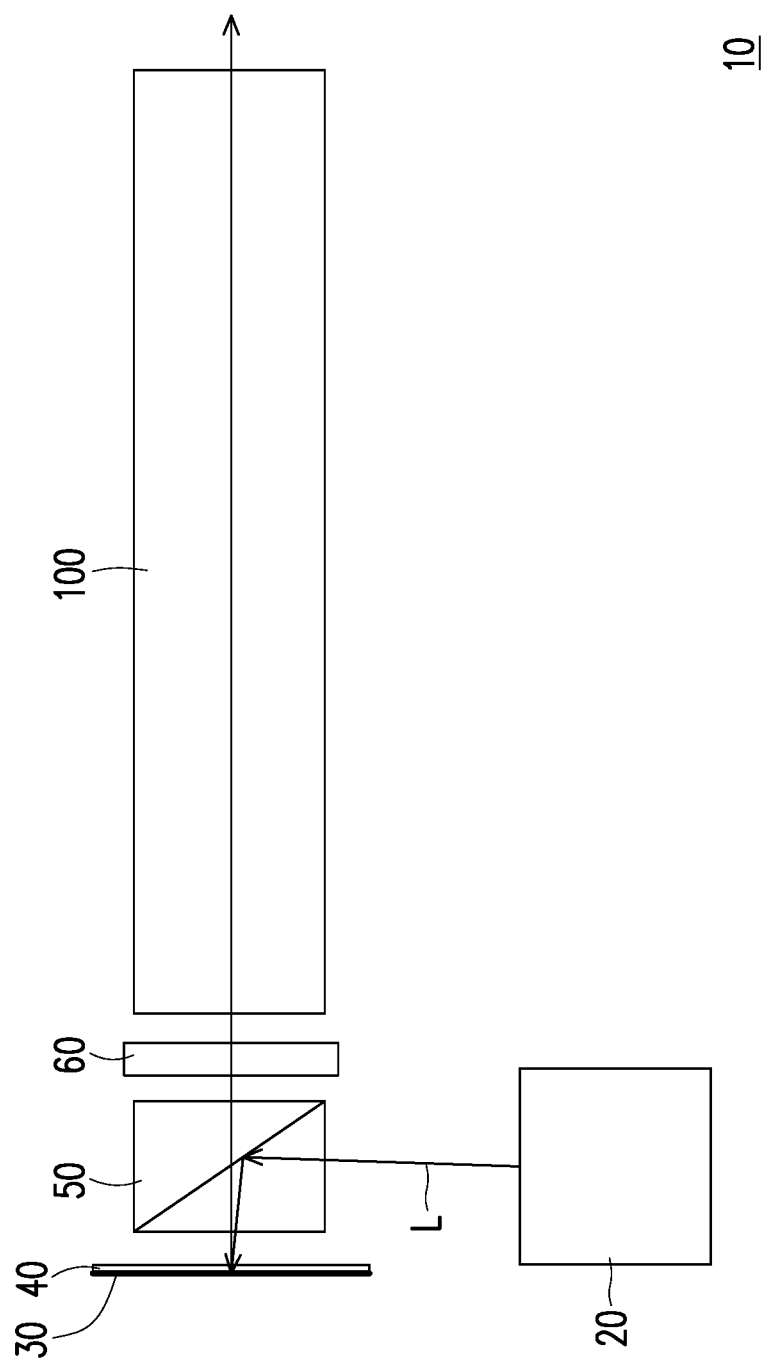
FIG. 1 is a schematic view of a projector according to a first embodiment of the invention.

FIG. 1 is a schematic view of a projector according to a first embodiment of the invention. Referring to FIG. 1, in the present embodiment, a projector 10 includes a light source 20, a light valve 30, and a projection lens 100.

The light source 20 is configured to provide light of different wavelengths as a source of image light. In the present embodiment, the light source 20 is, for example, a light-emitting diode (LED) or a laser diode (LD) capable of providing visible light such as red, green, and blue, or invisible light such as infrared light or ultraviolet light. However, the invention does not limit a category or a form of the light source 20, and for a detailed structure and implementation thereof, adequate instructions, advices, and implementation descriptions may be obtained from general knowledge in the art, and the descriptions thereof are omitted herein.

The light valve 30 may be configured to convert illumination light of different wavelengths into image light. The light valve 30 may be, for example, a reflective light modulator such as a liquid crystal on silicon (LCoS) panel or a digital micro-mirror device (DMD), and the light valve 30 may also be a transmissive light modulator such as a transparent liquid crystal panel, an electro-optical modulator, a magneto-optical modulator, and an acousto-optic modulator (AOM). The invention does not limit a form and a category of the light valve 30. In the present embodiment, the light valve 30 is a digital micromirror element, which includes a reflective surface consisting of a plurality of microlenses that may convert an illumination beam into a light beam having image information. For detailed steps and implementations for the foregoing conversion, adequate instructions, advices, and implementation descriptions may be obtained from general knowledge in the art, and the descriptions thereof are omitted herein.

The projection lens 100 is configured to project an image the image light on a target projection surface. The projection lens 100 includes, for example, one or a combination of a plurality of lenses with refractive power, and the lens may be, for example, a biconcave lens, a biconvex lens or a lens respectively having an optical surface shape of concave-convex, plano-convex, or plano-concave, and a non-planar lens. In some embodiments, except elements such as lenses and apertures, elements such as a plane mirror or a curved mirror may be selectively added between the lenses in the projection lens 100, to reflect or deflect an optical path of a light beam and project image light from the light valve 30 to a projection target. Detailed design of the projection lens 100 is described subsequently.

In the present embodiment, the projector 10 further includes elements such as a glass cover 40, a prism 50, and a transmissive smooth picture apparatus 60.

The glass cover 40 is configured to protect the light valve from dust.

The prism 50 is configured to adjust a light path of light of different wavelengths. In the present embodiment, the prism may utilize a total reflection surface thereof to reflect a light beam within a particular range of incident angles and allow a light beam within another range of incident angles to pass. In the present embodiment, the prism 50 is composed of two single prisms which are triangular columns but is not limited thereto, which the prism 50 may also include only a single prism or three or more single prisms. In this example, the prism 50 is a TIR prism in a travel manner of the light path, and may also be replaced by an RTIR prism.

The transmissive smooth picture (TSP) apparatus 60 may waggle along a single axis or multiple axes to make pixel points of a projected image fan out to a small extent, thereby increasing the resolution.

In the present embodiment, the light valve 30 is disposed downstream of a light path of the light source 20, and the projection lens 100 is disposed downstream of a light path of the light valve 30. In particular, in the present embodiment, the light beam provided by the light source 20 sequentially passes through the prism 50 and the glass cover 40 to the light valve 30. The light valve 30 converts the light beam into an image light beam having image information, then the image light beam may sequentially pass through the glass cover 40, the prism 50, and the transmissive smooth picture apparatus 60 to the projection lens 100, and finally the image beam is projected through the projection lens 100 and is imaged on a projection surface outside the projector 10.

Figure 2:
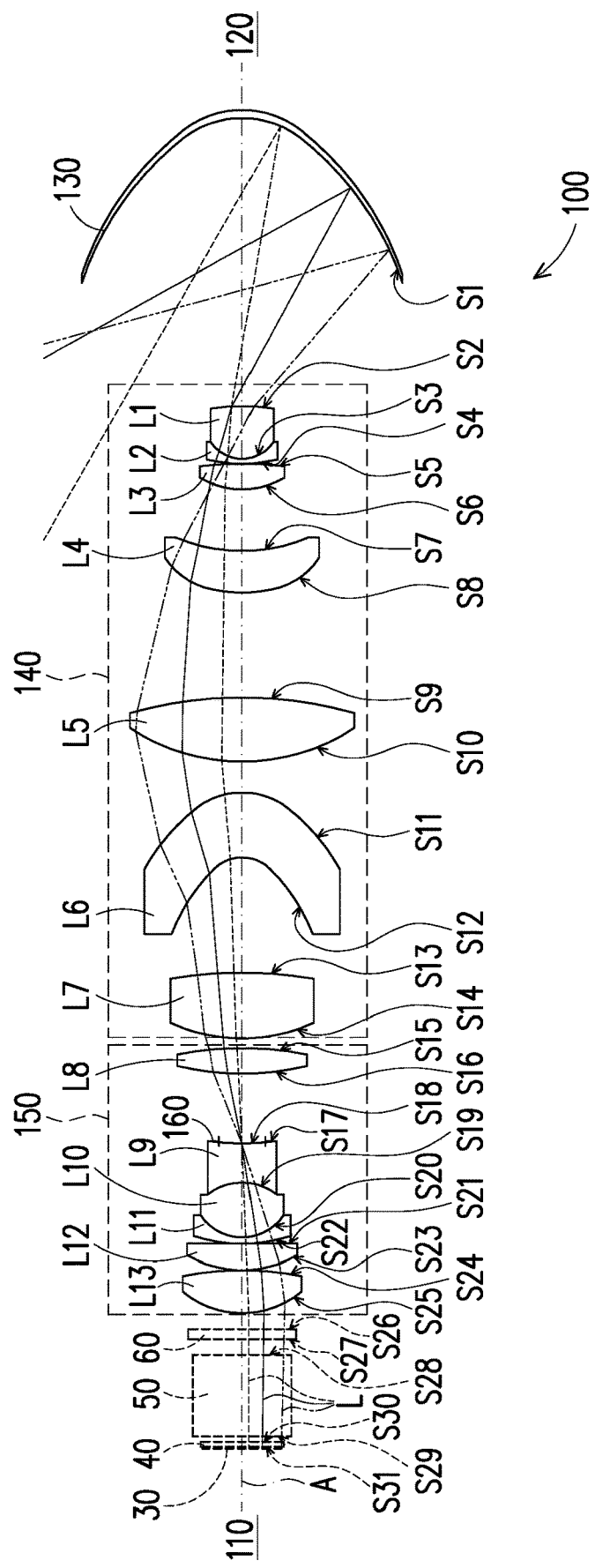
FIG. 2 is a schematic cross-sectional view of a projection lens according to the first embodiment of the invention.

FIG. 2 is a schematic cross-sectional view of a projection lens according to the first embodiment of the invention. Referring to FIG. 2, a projection lens 100 shown in FIG. 2 may be at least applied to the projector 10 shown in FIG. 1, and therefore the projector 10 applied to FIG. 1 is used as an example for description below, but the invention is not limited thereto. The projection lens 100 includes a lens group 150, a lens group 140, and a concave mirror 130.

In the present embodiment, the concave mirror 130 has an aspheric surface. An opening of the concave mirror 130 may be selectively equipped with a light-transmissive glass cover (not shown in FIG. 1) to seal a recessed portion in the concave mirror 130 so as to form an airtight space for dust prevention. In the present embodiment, the concave mirror 130 is axisymmetric relative to an optical axis A of the projection lens 100, but is not limited thereto. If necessary, the concave mirror 130 may be cut off as needed. For example, a specific portion of the concave mirror 130 above the optical axis and close to a light exit direction is cut off. In addition, when the concave mirror 130 is cut off, the concave mirror 130 has an upper opening and a lateral opening that faces the lens group 140. In this case, one or more glass covers may be selectively disposed on the upper opening and the lateral opening for dust prevention.

In the present embodiment, the projection lens includes 13 lenses with refractive power. When the number of lens with refractive power in the projection lens 100 is larger than 9, and less than or between 15 and 30, optimal and relatively good cost effectiveness are achieved. In addition, in the present embodiment, the projection lens 100 is a fixed focal lens.

In the present embodiment, the lens group 150 and the lens group 140 are coaxially arranged. In addition, when the lens group 140 includes 7, 10, 15 or fewer lenses with refractive power, optimal, relatively good, and good cost effectiveness are achieved. In addition, in the present embodiment, the lens group 140 includes at least two aspheric lenses, which may effectively reduce the number of lenses and improve aberration correction performance.

In the present embodiment, the lens group 150 includes six lenses and an aperture stop 160 disposed therein. When the lens group 150 includes 6, 10, 15, or fewer lenses, optimal, relatively good, and good cost effectiveness are achieved.

In particular, in the present embodiment, the lens group 150, the lens group 140, and the concave mirror 130 of the projection lens 100 are sequentially arranged from a minified side 110 to a magnified side 120 along an optical axis A of the projection lens 100. The minified side 110 is a light input side of the projection lens 100, and the magnified side 120 is a light output side of the projection lens 100. At one side of the projection lens 100 toward the minified side 110, the light valve 30, the glass cover 40, the prism 50, and the transmissive smooth picture apparatus 60 are sequentially arranged before the projection lens 100 from the minified side 110 to the magnified side 120.

In the present embodiment, in the lens group 150, a lens L13, a lens L12, a lens L11, a lens L10, a lens L9, an aperture stop 160, and a lens L8 are sequentially arranged from the minified side 110 to the magnified side 120 along an optical axis A of the projection lens 100. In the lens group 140, a lens L7, a lens L6, a lens L5, a lens L4, a lens L3, a lens L2, and a lens L1 are sequentially arranged from the minified side 110 to the magnified side 120 along the optical axis A. In other words, the lens L13 is a lens closest to the minified side 110 in the lens group 150, and is also a lens closest to the minified side 110 in the projection lens 100. The lens L8 is a lens closest to the magnified side 120 in the lens group 150. The lens L7 is a lens closest to the minified side 110 in the lens group 140. The lens L1 is a lens closest to the magnified side 120 in the lens group 140, and is also a lens with refractive power closest to the magnified side 120 in the projection lens 100. In the present embodiment, the aperture stop 160 is disposed between the lens L8 and the lens L9, that is, the aperture stop 160 is not the first or last optical element arranged in the lens group 150.

In the present embodiment, the lens L1 and the lens L2 form a compound lens, and the lens in the compound lens may be fixed to each other in a plurality of manners, for example, the lenses in compound lens are clamped mechanically or fixed to each other with an adhesive. The lens L9, the lens L10, and the lens L11 form a compound lens, for example, triplet lenses. In the present embodiment, the foregoing compound lenses are all cemented lens respectively. In the present embodiment, the lens L4, the lens L6, and the lens L13 are aspheric lenses, that is, a number of aspheric lenses in the whole projection lens 100 is 3.

In addition, in the present embodiment, the lens L7 is a lens closest to minified side 110 in the lens group 140.

In the present embodiment, there are two dimension parameters in the lens, one parameter being a clear aperture (CA) RF, which is also referred to as an optical effective diameter. The clear aperture may be simply understood as an optical effective region of lenses. The other parameter is an outer diameter TRF of the lens, the outer diameter TRF referring to a maximum diameter including a portion of outer contours of the clear aperture and other non-optical effective regions. In the present embodiment, the clear aperture RF and the outer diameter TRF are positively correlated, but there is no specific proportional relation between the clear aperture RF and the outer diameter TRF of the lens. The clear apertures RF and the outer diameters TRF of the lens L7, the lens L6, and the lens L5 are increased progressively and sequentially, and the clear apertures RF and the outer diameters TRF of the lens L5, the lens L4, the lens L3, the lens L2, and the lens L1 are decreased progressively and sequentially. The clear apertures RF and the outer diameters TRF of the lens L13, the lens L12, the lens L11, the lens L10, and the lens L9 are decreased progressively and sequentially, and the clear aperture RF of the lens L8 is respectively greater than the clear apertures of the lens L13, the lens L12, the lens L11, the lens L10, and the lens L9. The outer diameter TRF of the lens L8 is also greater than the outer diameters TRF of the lens L13, the lens L12, the lens L11, the lens L10, and the lens L9 respectively.

The lens L1 is a lens that is closest to the magnified side 120 in the lens group 140 and that has a minimum clear aperture RF and a minimum outer diameter TRF in comparison with other lenses in the lens group 140. In particular, in the lens group 140, the clear aperture RF and the outer diameter TRF of the lens is changed from the minified side 110 to the magnified side 120 first from small to large and then from large to small.

In the present embodiment, the projection lens 100 is an ultra-short-focus lens. For example, a total length TL of the lens is a distance from a surface (that is, a surface S25) of the lens L13 toward the minified side 110 to an optical axis A of the concave mirror 130 (that is, a surface S1) on the projection lens 100, and an EFL is an effective focal length of the projection lens 100. When TL/EFL≥100, TL/EFL≥70, and TL/EFL≥50, optimal, relatively optimal, and good projection distances are respectively achieved. In the present embodiment, TL/EFL is 106.1. In the present embodiment, when the projection lens 100 is focusing, elements such as the lenses and apertures in the lens group 150 are fixed on the optical axis A of the projection lens 100, and a position and a distance along a direction that is horizontal or perpendicular to the optical axis A relative to the concave mirror 130 are fixed. During focusing, one or more lenses in the lens group 140 are movable relative to the concave mirror 130. In the present embodiment, a lens closest to the lens group 150, such as the lens L7, is capable of moving along the optical axis A of the projection lens relative to the concave mirror 130. Because the lenses in the lens group 150 are all fixed when focusing, one lens closest to the minified side in the lens group 150 is required to be movable during focusing. Accordingly, the lens group 140 and the lens group 150 may be differentiated. In the present embodiment, the concave mirror 130, the lens group 140, and the lens group 150 are arranged coaxially.

Figure 3:
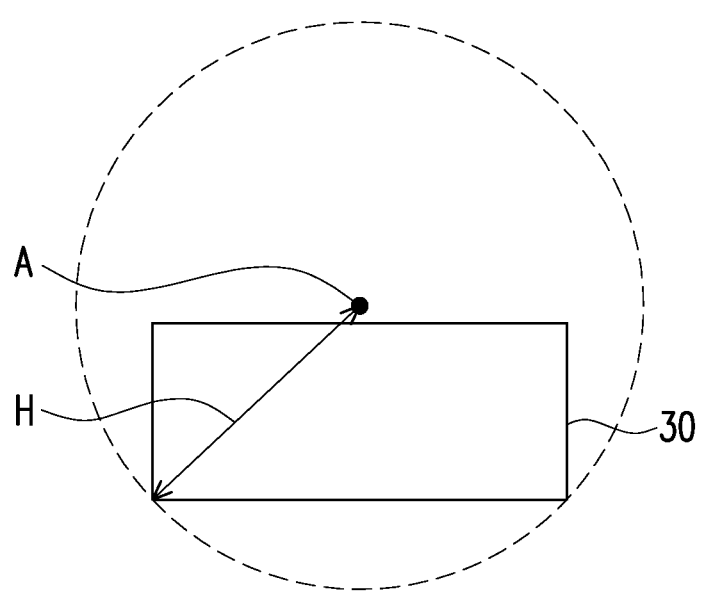
FIG. 3 is a schematic view of a light valve according to the first embodiment of the invention.

FIG. 3 is a schematic view of a light valve according to the first embodiment of the invention. Referring to FIG. 2 and FIG. 3, the minified side 110 of the projection lens 100 is substantial telecentric, or say, has a substantial telecentric characteristic. For example, a telecentric lens is a lens with at least one infinitely far pupil. A chief ray with an infinitely far pupil indicates (a) that the chief ray is parallel to an optical axis of an object space if an entrance pupil is infinitely far away, or (b) the chief ray is parallel to an optical axis of an image space if an exit pupil is infinitely far away. In actual application, a telecentric pupil is actually not necessarily infinitely far away because a lens that has the entrance or exit pupil and that has a long distance from an optical surface of the lens may substantially serve as a telecentric system for operation. Because the chief ray of such lens is substantially parallel to the optical axis, the lens is generally equivalent, in function, to a lens that has the pupil with an infinitely far theoretical (Gaussian) position. In the present embodiment, when the light beam enters the projection lens from the minified side 110, chief rays L of the light beam are respectively parallel to the optical axis A of the projection lens 100. The chief rays L substantially travel along an optical axis of the projection lens 100. For example, an angle of inclination of the chief ray L is less than or equal to 5 degrees, and the invention is not limited thereto.

In addition, referring to FIG. 3, the projection lens 100 has a corresponding image height IMH on an image plane. In the present embodiment, a light valve 30 is disposed on the image plane at the minified side, and the image height IMH equates to a maximum straight line length from the optical axis A to a diagonal of an active surface of the light valve 30.

In the present embodiment, corresponding to the telecentric characteristic of the minified side of the projection lens 100, an outer diameter TRF (including an optical effective region and ineffective area) of a lens closest to the minified side 110 in the projection lens 100 and the clear aperture RF are twice or larger than the image height IMH. In the present embodiment, the clear aperture RF divided by the image height IMH (RF/IMH) is approximately 3. Because the outer diameter TRF is greater than the clear aperture RF, the outer diameter TRF divided by the image height IMH (TRF/IMH) is also greater than 3.

In the present embodiment, the projection lens 100 is a three-time imaging system. A first intermediate image of the projection lens 100 is formed between the lens L5 and the lens L4. A second intermediate image is formed between the lens L1 the concave mirror 130. Afterwards, the projection lens 100 projects a light beam onto a projection surface (for example, a projection screen). The entire process is referred to as three-time imaging.

In the present embodiment, a light outputting end (facing the lens L4 side) of the lens L5 and a light inputting end (facing the lens L5 side) of the lens L4 respectively non-telecentric, or say, have a non-telecentric characteristic. In addition, the chief rays L of light beams between the lens L5 and the lens L4 are not virtually all parallel to the optical axis A of the projection lens 100.

In the present embodiment, the projection lens 100 may project, onto a second image plane of the projection surface for imaging, a ray of light input by the light valve 30 located on a first image plane. In the present embodiment, a projection screen or a flat surface may be disposed on the projection surface to improve imaging quality. A light beam starting from a center of the foregoing first image surface to a center of a second image surface passes through optical axes of the lens group 140, the lens group 150, or the concave lens 130 for a total of three times.

For example, the projection lens 100 enables the chief ray L of the light beam transmitted by the light valve 30 into the projection lens 100 to respectively pass through the optical A of the projection lens 100 between optical paths of the lens L9 and the lens L10, between optical paths of the lens L1 and the concave mirror 130, and downstream of an optical path of the concave mirror 130 for a total of three times.

In the present embodiment, a projection ratio of the projection lens 100 is approximately 0.22, and an aperture value F/# is 1.8 and is between 1.7 and 1.9 upon appropriate adjustment.

In the present embodiment, actual design of the foregoing elements may be shown in the following table I.

TABLE I

TL (mm) = 233.5; EFL (mm) = 2.2; TL/EFL = 106.1;
RF (mm) = 26.9; IMH (mm) = 8.945; RF/IMH = 3.0; F/# = 1.8;

| Element | Surface | Radius (mm) | Interval (mm) | Refractive index (Nd) | Abbe number (Vd) | Clear aperture (RF) |
|---|---|---|---|---|---|---|
| Concave mirror 130 | S1* | −20.02 | 56.39 | | | 72.4 |
| Lens L1 | S2 | −19.74 | 10.45 | 1.50 | 81.5 | 11.4 |
| Lens L2 | S3 | 9.49 | 1.00 | 1.67 | 32.1 | 14.0 |
| | S4 | 44.49 | 0.20 | | | 16.2 |
| Lens L3 | S5 | −162.60 | 4.84 | 1.67 | 47.2 | 17.5 |
| | S6 | 20.74 | 11.84 | | | 19.1 |
| Lens L4 | S7* | 63.11 | 8.00 | 1.53 | 56.3 | 31.4 |
| | S8* | 130.25 | 20.74 | | | 35.0 |
| Lens L5 | S9 | −112.15 | 12.67 | 1.66 | 50.9 | 49.7 |
| | S10 | 51.39 | 6.00 | | | 50.7 |
| Lens L6 | S11* | −18.83 | 12.60 | 1.53 | 56.3 | 44.0 |
| | S12* | −9.43 | 22.59 | | | 32.0 |
| Lens L7 | S13 | −101.81 | 12.60 | 1.49 | 70.2 | 32.3 |
| | S14 | 45.43 | 2.01 | | | 31.9 |
| Lens L8 | S15 | −99.00 | 4.83 | 1.74 | 44.8 | 29.0 |
| | S16 | 64.24 | 12.90 | | | 28.2 |
| Aperture stop 160 | S17 | Infinity | 0.62 | | | 10.2 |
| Lens L9 | S18 | 32.23 | 7.90 | 1.65 | 33.8 | 10.3 |
| Lens L10 | S19 | −15.47 | 10.69 | 1.50 | 81.5 | 15.3 |
| Lens L11 | S20 | 11.72 | 1.00 | 1.67 | 32.1 | 18.3 |
| | S21 | 45.51 | 0.20 | | | 21.8 |
| Lens L12 | S22 | Infinity | 4.81 | 1.80 | 22.8 | 23.5 |
| | S23 | 30.73 | 0.20 | | | 24.8 |
| Lens L13 | S24* | −46.80 | 8.42 | 1.51 | 64.0 | 26.3 |
| | S25* | 20.20 | 0.10 | | | 26.9 |
| Transmissive smooth picture apparatus 60 | S26 | Infinity | 2 | 1.52 | | |
| | S27 | Infinity | 3.2 | | | |
| Prism 50 | S28 | Infinity | 16 | 1.73 | | |
| | S29 | Infinity | 0.8 | | | |
| Glass cover 40 | S30 | Infinity | 1.1 | 1.51 | | |
| | S31 | Infinity | 0.303 | | | |

Refer to both FIG. 2 and Table I. In particular, in the projection lens 100 of the present embodiment, the concave mirror 130 has a surface S1, the surface S1 being an aspheric surface. The lens L1 has a surface S2 from the magnified side 120 to the minified side 110, the lens L2 sequentially has a surface S3 and a surface S4 from the magnified side 120 to the minified side 110, and so on. Surfaces corresponding to the elements are omitted herein. An imaging face of the aperture stop 160 is represented by a surface S17, and a curvature radius (shown as radius in the table 1) thereof is infinitely big (that is, a plane perpendicular to the optical axis A). The lens L1 and the lens L2, the lens L9 and the lens L10, and the lens L11 and the lens L12 respectively have a common surface S3, a surface S19, and a surface S20, which means that the lens L2 and the lens L3 are two connected lens along the optical axis A or a doublet lens. The lens L9, the lens L10, and the lens L11 are three connected lenses along the optical axis A, or a triplet lens.

In addition, an interval in Table I is a reciprocal of a spacing from the surface at the magnified side 120 to a next surface at the minified side 110. For example, a thickness of the lens L1 is 10.45 mm, a thickness of the lens L2 is 1.00 mm, and a distance between the lens L2 and the lens L3 is 0.20 mm, and so on, and the descriptions thereof are omitted herein. In Table I, a "surface" number marked with a * symbol represents an aspheric surface.

In addition, a curvature radius in Table I is a curvature radius of the surface, positive and negative values thereof representing curvature directions. For example, a curvature radius of a surface S5 of the lens L3 is negative, and a curvature radius of a surface S6 of the lens L3 is positive, and therefore the lens L3 is a biconvex lens. A curvature radius of a surface S11 of the lens L6 is negative, and a curvature radius of a surface S12 of the lens L6 is negative, and therefore the lens L6 is a meniscus lens with a concave surface toward the minified side 110, and so on.

In the present embodiment, a surface S1 of a concave mirror 130, a surface S7 and a surface S8 of the lens L4, a surface S11 and a surface S12 of the lens L6, and a surface S24 and a surface S25 of the lens L13 are aspheric surfaces. Table II below lists quadric coefficient values K and aspheric coefficients A-G of each order of the surface S1 of the concave mirror 130, the surface S7 and the surface S8 of the lens L4, the surface S11 and the surface S12 of the lens L6, and the surface S24 and the surface S25 of the lens L13. An aspheric polynomial may be expressed by the following formula:

$$x = \frac{c'y^2}{1+\sqrt{1-(1+K)c'^2y^2}} + Ay^2 + Ay^4 + By^6 + Cy^8 + Dy^{10} + Ey^{12} + Fy^{14} + Gy^{16}L. \quad (1)$$

Herein, x is an offset (sag) in a direction of the optical axis A, c' is a reciprocal of a radius of an osculating sphere, that is, a reciprocal of a curvature radius near the optical axis, K is a quadric coefficient, and y is an aspheric height, that is, a height from a center of the lens to an edge of the lens. A-G represent aspheric coefficients of each order of the aspheric polynomial respectively.

TABLE II

|   | S1 | S7 | S8 | S11 |
|---|---|---|---|---|
| K | −1.10 | 0 | 0 | −1.85 |
| A | 6.48E−06 | 5.91E−05 | 8.42E−05 | −1.46E−05 |
| B | −1.40E−08 | −4.18E−07 | −1.13E−07 | −6.97E−08 |
| C | 1.69E−11 | 1.17E−09 | 5.50E−11 | 2.28E−10 |
| D | −1.60E−14 | −1.21E−12 | 1.71E−13 | −3.80E−13 |
| E | 9.46E−18 | 0 | 0 | 4.48E−16 |
| F | −3.11E−21 | 0 | 0 | −2.29E−19 |
| G | 3.82E−25 | 0 | 0 | 0 |

|   | S12 | S24 | S25 |
|---|---|---|---|
| K | −1.76 | 0 | 0 |
| A | −1.39E−04 | 2.04E−05 | −3.61E−05 |
| B | 1.66E−07 | 3.77E−08 | 1.13E−07 |
| C | 4.62E−10 | −1.10E−10 | −3.92E−10 |

TABLE II-continued

| D | −9.58E−13 | 0 | 0 |
|---|---|---|---|
| E | 7.91E−16 | 0 | 0 |
| F | −1.06E−18 | 0 | 0 |
| G | 0 | 0 | 0 |

Figure 4:
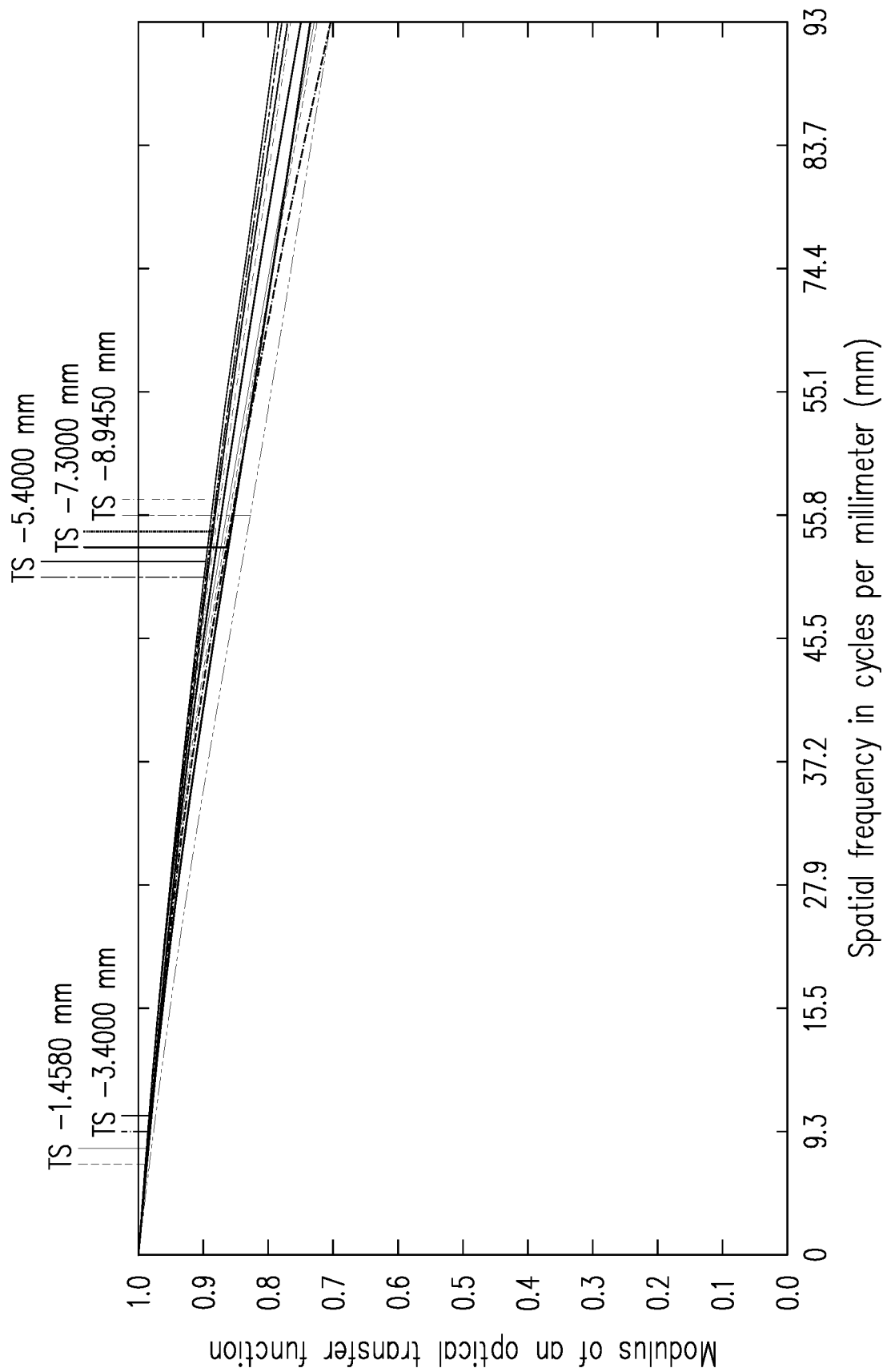
FIG. 4 is a graph showing optical imaging simulation data of a projection lens according to the first embodiment of the invention.

FIG. 4 is a graph showing imaging optical simulation data of a projection lens according to the first embodiment of the invention. Referring to FIG. 4, FIG. 4 is a modulation transfer function (MTF) curve graph of a projection lens 100, a horizontal axis thereof being a spatial frequency in cycles per millimeter (mm), and a vertical axis thereof being a modulus of the optical transfer function, T representing a curve in a meridional direction, S representing a curve in a sagittal direction, and a value after "TS" representing an image height. As a result, it may be verified that the modulation transfer function curve displayed by the projection lens 100 of the present embodiment is within a standard range, and therefore the projection lens has good optical imaging quality, as shown in FIG. 4.

Figure 5:
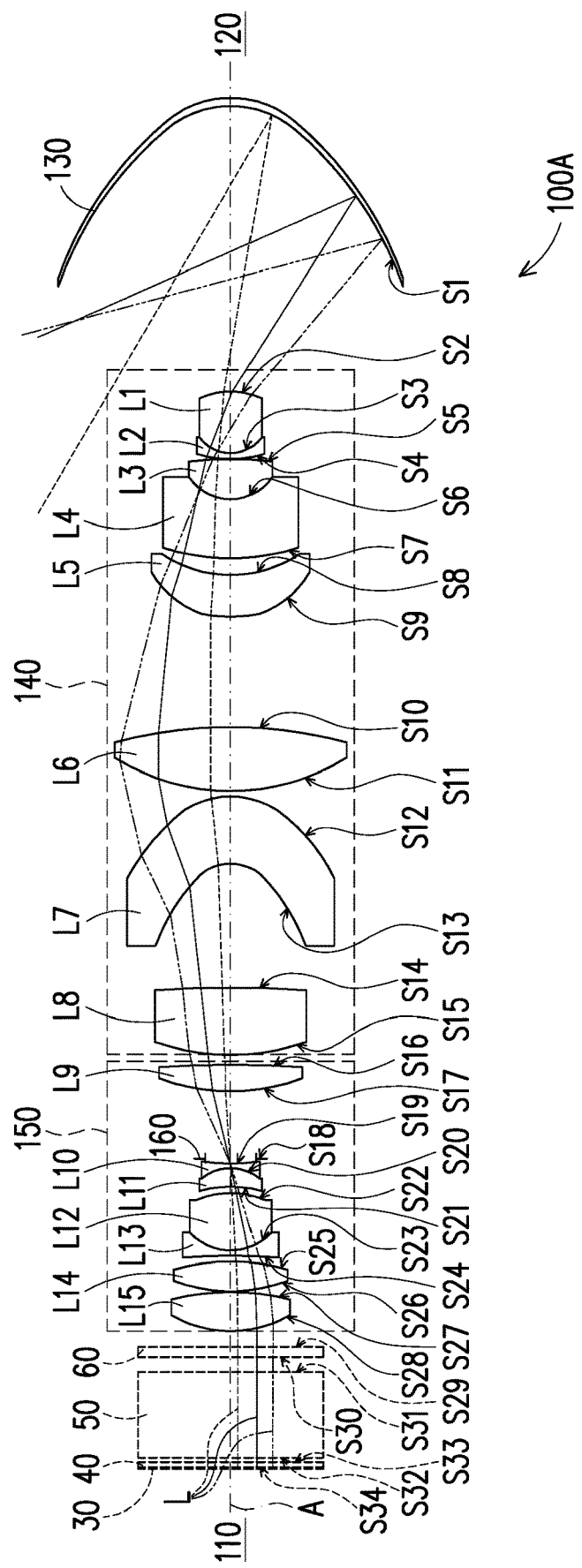
FIG. 5 is a schematic cross-sectional view of a projection lens according to a second embodiment of the invention.

FIG. 5 is a schematic cross-sectional view a projection lens according to a second embodiment of the invention. Referring to FIG. 5, a projection lens 100A shown in FIG. 5 may be at least applied to the projector 10 shown in FIG. 1, and therefore the projector 10 applied to FIG. 1 is used as an example for description below, but the invention is not limited thereto. In the present embodiment, the projection lens 100A of the present embodiment is similar to the projection lens 100 shown in FIG. 2, and a main difference between both is that a lens group 150 of the projection lens 100A in the present embodiment has two sets of doublet lenses, and a lens group 140 also has two sets of doublet lenses.

In particular, in the present embodiment, in the lens group 150, a lens L15, a lens L14, a lens L13, a lens L12, a lens L11, a lens L10, an aperture stop 160, and a lens L9 are sequentially arranged from a minified side 110 to a magnified side 120 along an optical axis A. In the lens group 140, a lens L8, a lens L7, a lens L6, a lens L5, a lens L4, a lens L3, a lens L2, and a lens L1 are sequentially arranged from the minified side 110 to the magnified side 120 along the optical axis A. In other words, the lens L15 is a lens closest to the minified side 110 in the lens group 150, and is also a lens closest to the minified side 110 in the projection lens 100A. The lens L9 is a lens closest to the magnified side 120 in the lens group 150. The lens L8 is a lens closest to the minified side 110 in the lens group 140. The lens L1 is a lens closest to the magnified side 120 in the lens group 140, and is also a lens closest to the magnified side 120 in the projection lens 100A.

In the present embodiment, actual design of the foregoing elements may be shown in the following Table III. An interpretation manner of Table III is the same as that of Table I, and the descriptions thereof are omitted herein.

TABLE III

TL (mm) = 233.5; EFL (mm) = 2.2; TL/EFL = 106.1;
RF (mm) = 25.5; IMH (mm) = 8.945; RF/IMH = 2.9; F/# = 1.7;

| Element | Surface | Radius (mm) | Interval (mm) | Refractive index (Nd) | Abbe number (Vd) | Clear aperture (RF) |
|---|---|---|---|---|---|---|
| Concave mirror 130 | S1* | −20.43 | 54.55 | | | 72.2 |

TABLE III-continued

TL (mm) = 233.5; EFL (mm) = 2.2; TL/EFL = 106.1;
RF (mm) = 25.5; IMH (mm) = 8.945; RF/IMH = 2.9; F/# = 1.7;

| Element | Surface | Radius (mm) | Interval (mm) | Refractive index (Nd) | Abbe number (Vd) | Clear aperture (RF) |
|---|---|---|---|---|---|---|
| Lens L1 | S2 | −17.24 | 11.73 | 1.50 | 81.5 | 13.1 |
| Lens L2 | S3 | 8.85 | 1.00 | 1.61 | 37.0 | 12.4 |
|  | S4 | 26.78 | 0.20 |  |  | 14.2 |
| Lens L3 | S5 | −142.03 | 7.50 | 1.83 | 42.7 | 15.9 |
| Lens L4 | S6 | 11.85 | 11.31 | 1.72 | 29.5 | 18.0 |
|  | S7 | 53.85 | 3.09 |  |  | 29.2 |
| Lens L5 | S8* | 23.52 | 8.00 | 1.53 | 56.3 | 30.5 |
|  | S9* | 25.86 | 21.61 |  |  | 33.9 |
| Lens L6 | S10 | −135.55 | 11.55 | 1.76 | 40.1 | 49.1 |
|  | S11 | 54.27 | 1.23 |  |  | 50.1 |
| Lens L7 | S12* | −19.69 | 12.60 | 1.53 | 56.3 | 44.6 |
|  | S13* | −9.14 | 23.90 |  |  | 32.2 |
| Lens L8 | S14 | −259.90 | 12.57 | 1.66 | 50.9 | 32.5 |
|  | S15 | 59.82 | 1.84 |  |  | 32.3 |
| Lens L9 | S16 | −175.40 | 5.08 | 1.76 | 56.3 | 30.5 |
|  | S17 | 51.32 | 12.95 |  |  | 29.9 |
| Aperture stop 160 | S18 | Infinity | 0.88 |  |  | 10.9 |
| Lens L10 | S19 | 34.02 | 1.00 | 1.70 | 30.1 | 11.2 |
| Lens L11 | S20 | −10.43 | 3.57 | 1.70 | 41.2 | 12.5 |
|  | S21 | −31.95 | 1.11 |  |  | 13.4 |
| Lens L12 | S22 | −23.20 | 10.88 | 1.50 | 81.5 | 15.4 |
| Lens L13 | S23 | 13.50 | 1.00 | 1.67 | 32.1 | 17.9 |
|  | S24 | −149.35 | 1.24 |  |  | 20.5 |
| Lens L14 | S25 | −51.22 | 5.51 | 1.80 | 22.8 | 23.7 |
|  | S26 | 40.30 | 0.20 |  |  | 24.6 |
| Lens L15 | S27* | −34.19 | 7.40 | 1.51 | 64.0 | 25.2 |
|  | S28* | 23.27 |  |  |  | 25.5 |
| Transmissive smooth picture apparatus 60 | S29 | Infinity | 2.0 | 1.52 | 58.6 |  |
|  | S30 | Infinity | 3.2 |  |  |  |
| Prism 50 | S31 | Infinity | 16.0 | 1.73 | 28.3 |  |
|  | S32 | Infinity | 0.8 |  |  |  |
| Glass cover 40 | S33 | Infinity | 1.1 | 1.51 | 62.9 |  |
|  | S34 | Infinity | 0.3 |  |  |  |

Referring to both FIG. 5 and Table III, the lens L1 and the lens L2, the lens L3 and the lens L4, the lens L10 and the lens L11, and the lens L12 and the lens L13 form compound lenses, for example, doublet lenses. The lens L5, the lens L7, and the lens L15 are aspheric lenses. In other words, the surface S1 of the concave mirror 130, the surface S8 and the surface S9 of the lens L5, the surface S12 and the surface S13 of the lens L7, and the surface S27 and the surface S28 of the lens L15 are aspheric surfaces. In addition, for the remaining optical characteristics and effects thereof, reference may be made to the description of the projection lens 100 in FIG. 1, and the descriptions thereof are omitted herein.

Table IV below lists quadric coefficient values K and aspheric coefficients A-G of each order of the surface S1 of the concave mirror 130, the surface S8 and the surface S9 of the lens L5, the surface S12 and the surface S13 of the lens L7, and the surface S27 and the surface S28 of the lens L15.

TABLE IV

|  | S1 | S8 | S9 | S12 |
|---|---|---|---|---|
| K | −1.12 | 0 | 0 | −2.50 |
| A | 5.70E−06 | −2.30E−05 | 1.94E−05 | −3.03E−05 |
| B | −1.35E−08 | −4.37E−08 | 4.71E−08 | −2.86E−08 |
| C | 1.65E−11 | 7.77E−11 | −6.99E−11 | 1.62E−10 |
| D | −1.57E−14 | −9.50E−14 | −4.09E−16 | −3.37E−13 |

TABLE IV-continued

| E | 9.46E−18 | 0 | 0 | 4.48E−16 |
|---|---|---|---|---|
| F | −3.26E−21 | 0 | 0 | −2.29E−19 |
| G | 4.50E−25 | 0 | 0 | 0 |

|  | S13 | S27 | S28 |
|---|---|---|---|
| K | −1.69 | 0 | 0 |
| A | −1.60E−04 | 2.83E−05 | −4.29E−05 |
| B | 2.99E−07 | −1.06E−10 | 7.96E−08 |
| C | 8.67E−11 | 3.89E−10 | 7.41E−11 |
| D | −5.34E−13 | −6.24E−13 | −5.81E−13 |
| E | 7.91E−16 | 0 | 0 |
| F | −1.06E−18 | 0 | 0 |
| G | 0 | 0 | 0 |

Figure 6:
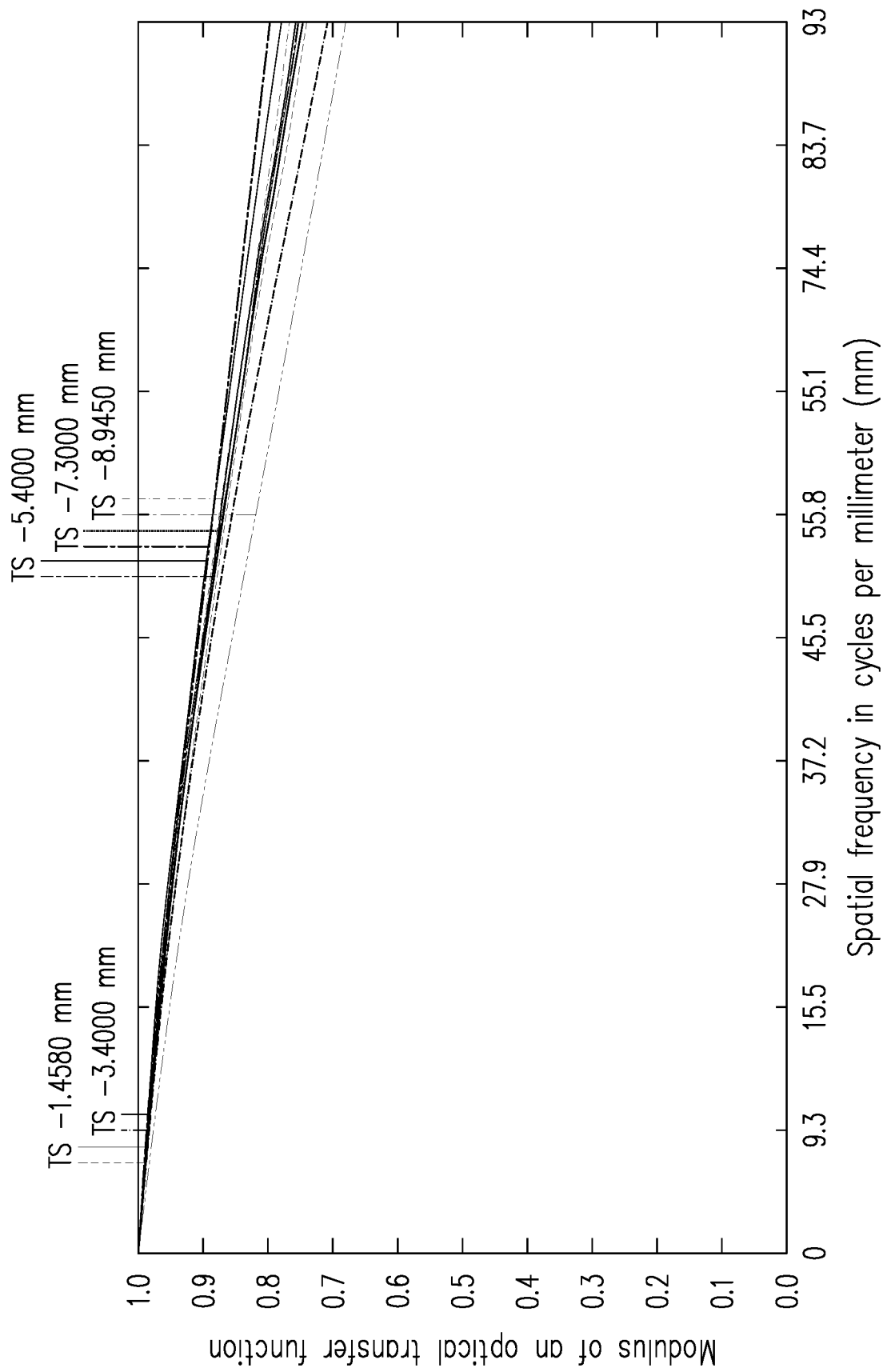
FIG. 6 is a graph showing optical imaging simulation data of the projection lens according to the second embodiment of the invention.

FIG. 6 is a graph showing optical imaging simulation data of the projection lens according to the second embodiment of the invention. Referring to FIG. 6, FIG. 6 is a modulation transfer function (MTF) curve graph of a projection lens 100A. An interpretation manner of FIG. 6 is the same as that of FIG. 3, and the descriptions thereof are omitted herein.

As a result, it may be verified that the modulation transfer function curve displayed by the projection lens 100A of the present embodiment is within a standard range, and therefore the projection lens has good optical imaging quality.

Figure 7:
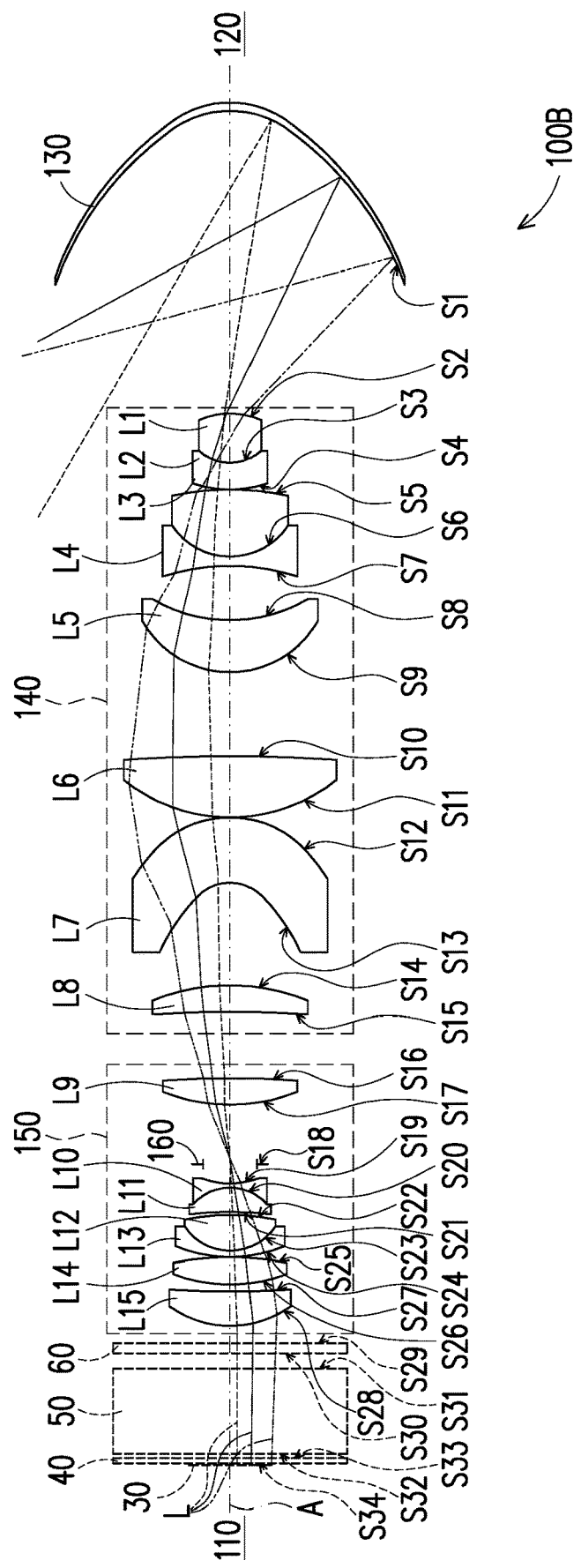
FIG. 7 is a schematic cross-sectional view of a projection lens according to a third embodiment of the invention.

FIG. 7 is a schematic cross-sectional view of a projection lens according to a third embodiment of the invention. Referring to FIG. 7, a projection lens 100B shown in FIG. 7 may be at least applied to the projector 10 shown in FIG. 1, and therefore the projector 10 applied to FIG. 1 is used as an example for description below, but the invention is not limited thereto.

The projection lens 100B of the present embodiment is similar to the projection lens 100 shown in FIG. 2, and a main difference between both is that a lens group 150 of the projection lens 100B in the present embodiment has two sets of doublet lenses, and a lens group 140 also has two sets of doublet lenses. In addition, a position of an aspheric lens in the lens group 140 of the projection lens 100B is different from a position of an aspheric lens in the lens group 140 of the projection lens 100.

In the present embodiment, actual design of the foregoing elements may be shown in the following Table V. An interpretation manner of the following table is the same as that of Table I, and the descriptions thereof are omitted herein.

TABLE V

TL (mm) = 233.5; EFL (mm) = 2.2; TL/EFL = 106.1;
RF (mm) = 25.7; IMH (mm) = 8.945; RF/IMH = 2.9; F/# = 1.7;

| Element | Surface | Radius (mm) | Interval (mm) | Refractive index (Nd) | Abbe number (Vd) | Clear aperture (RF) |
|---|---|---|---|---|---|---|
| Concave mirror 130 | S1* | −21.37 | 58.27 |  |  | 77.07 |
| Lens L1 | S2 | −16.87 | 9.30 | 1.50 | 81.5 | 11.6 |
| Lens L2 | S3 | 10.64 | 5.18 | 1.82 | 25.5 | 11.2 |
|  | S4 | 26.96 | 0.20 |  |  | 15.7 |
| Lens L3 | S5 | −51.81 | 12.60 | 1.85 | 40.0 | 21.0 |
| Lens L4 | S6 | 15.68 | 2.00 | 1.59 | 38.3 | 24.6 |
|  | S7 | −58.15 | 10.16 |  |  | 28.6 |
| Lens L5 | S8 | 40.53 | 10.03 | 1.75 | 40.5 | 33.1 |
|  | S9 | 22.66 | 16.21 |  |  | 37.2 |
| Lens L6 | S10* | −106.89 | 11.49 | 1.53 | 56.3 | 46.0 |
|  | S11* | 37.52 | 0.23 |  |  | 47.2 |
| Lens L7 | S12* | −35.09 | 12.43 | 1.53 | 56.3 | 42.4 |
|  | S13* | −9.80 | 19.83 |  |  | 30.8 |

TABLE V-continued

TL (mm) = 233.5; EFL (mm) = 2.2; TL/EFL = 106.1;
RF (mm) = 25.7; IMH (mm) = 8.945; RF/IMH = 2.9; F/# = 1.7;

| Element | Surface | Radius (mm) | Interval (mm) | Refractive index (Nd) | Abbe number (Vd) | Clear aperture (RF) |
|---|---|---|---|---|---|---|
| Lens L8 | S14 | −45.12 | 5.22 | 1.84 | 40.2 | 33.2 |
|  | S15 | −604.37 | 12.45 |  |  | 33.0 |
| Lens L9 | S16 | −239.94 | 5.09 | 1.85 | 33.8 | 28.5 |
|  | S17 | 45.48 | 11.57 |  |  | 28.0 |
| Aperture stop 160 | S18 | Infinity | 3.58 |  |  | 10.9 |
| Lens L10 | S19 | 21.67 | 1.00 | 1.70 | 28.8 | 12.1 |
| Lens L11 | S20 | −11.80 | 4.49 | 1.71 | 46.8 | 14.5 |
|  | S21 | −88.68 | 0.76 |  |  | 15.8 |
| Lens L12 | S22 | −71.63 | 6.83 | 1.50 | 81.5 | 17.0 |
| Lens L13 | S23 | 12.19 | 1.00 |  |  | 18.4 |
|  | S24 | 34.76 | 0.20 |  |  | 21.4 |
| Lens L14 | S25 | −77.11 | 5.17 | 1.80 | 22.8 | 24.5 |
|  | S26 | 37.19 | 1.10 |  |  | 25.2 |
| Lens L15 | S27* | −59.88 | 7.10 | 1.51 | 64.0 | 25.0 |
|  | S28* | 20.40 | 3.10 |  |  | 25.7 |
| Transmissive smooth picture apparatus 60 | S29 | Infinity | 2.0 | 1.52 | 58.6 |  |
|  | S30 | Infinity | 3.2 |  |  |  |
| Prism 50 | S31 | Infinity | 16.0 | 1.73 | 28.3 |  |
|  | S32 | Infinity | 0.8 |  |  |  |
| Glass cover 40 | S33 | Infinity | 1.1 | 1.51 | 62.9 |  |
|  | S34 | Infinity | 0.3 |  |  |  |

Referring to both FIG. 7 and Table V, the lens L1 and the lens L2, the lens L3 and the lens L4, the lens L10 and the lens L11, and the lens L12 and the lens L13 form compound lenses, for example, doublet lenses. The lens L6, the lens L7, and the lens L15 are aspheric lenses. In other words, the surface S1 of the concave mirror 130, the surface S10 and the surface S11 of the lens L6, the surface S12 and the surface S13 of the lens L7, and the surface S27 and the surface S28 of the lens L15 are aspheric surfaces. In addition, for the remaining optical characteristics and effects thereof, reference may be made to the description of the projection lens 100 in FIG. 1, and the descriptions thereof are omitted herein.

Table VI below lists quadric coefficient values K and aspheric coefficients A-G of each order of the surface S1 of the concave mirror 130, the surface S10 and the surface S11 of the lens L6, the surface S12 and the surface S13 of the lens L7, and the surface S27 and the surface S28 of the lens L15.

TABLE VI

|  | S1 | S10 | S11 | S12 |
|---|---|---|---|---|
| K | −1.09 | 0 | 0 | −0.35 |
| A | 5.61E−06 | 9.35E−06 | −7.02E−06 | −4.50E−05 |
| B | −1.29E−08 | 1.03E−08 | 2.28E−08 | 1.91E−08 |
| C | 1.64E−11 | −4.85E−11 | −2.98E−11 | 1.25E−10 |
| D | −1.57E−14 | 3.11E−14 | 5.32E−15 | −3.19E−13 |
| E | 9.46E−18 | 0 | 0 | 4.48E−16 |
| F | −3.27E−21 | 0 | 0 | −2.29E−19 |
| G | 4.80E−25 | 0 | 0 | 0 |

|  | S13 | S27 | S28 |
|---|---|---|---|
| K | −1.76 | 0 | 0 |
| A | −1.76E−04 | 3.87E−05 | −2.95E−05 |
| B | 4.11E−07 | −1.02E−08 | 2.40E−08 |
| C | 5.81E−12 | 2.98E−10 | 1.81E−10 |
| D | −7.53E−13 | 3.13E−13 | 3.64E−14 |

TABLE VI-continued

|  |  |  |  |
|---|---|---|---|
| E | 7.91E−16 | 0 | 0 |
| F | −1.06E−18 | 0 | 0 |
| G | 0 | 0 | 0 |

Figure 8:
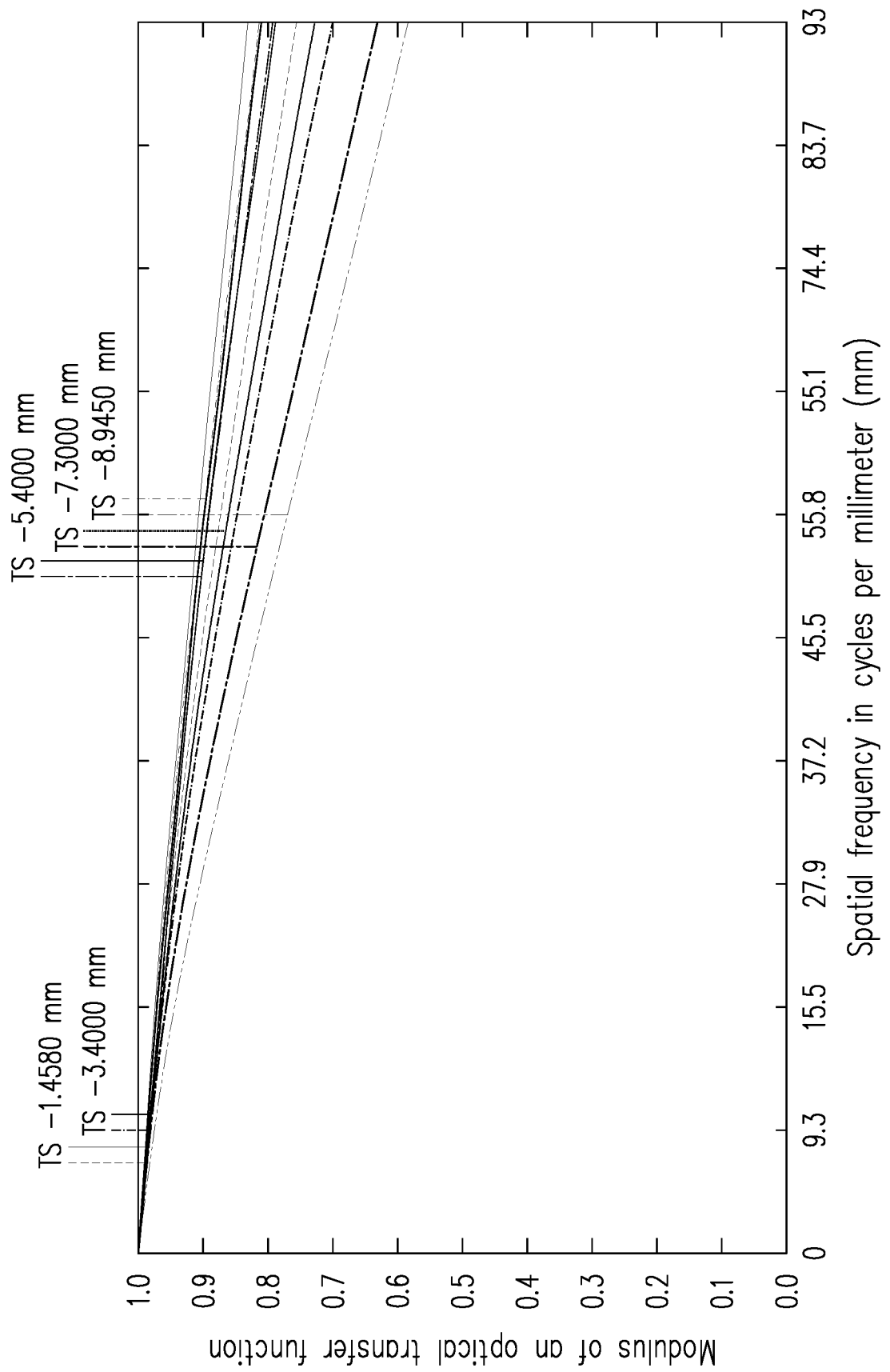
FIG. 8 is a graph showing optical imaging simulation data of the projection lens according to the third embodiment of the invention.

FIG. 8 is a graph showing imaging optical simulation data of the projection lens according to the third embodiment of the invention. Referring to FIG. 8, FIG. 8 is a modulation transfer function (MTF) curve graph of a projection lens 100B. An interpretation manner of FIG. 8 is the same as that of FIG. 3, and the descriptions thereof are omitted herein. As a result, it may be verified that the modulation transfer function curve displayed by the projection lens 100B of the present embodiment is within a standard range, and therefore the projection lens has good optical imaging quality.

Figure 9:
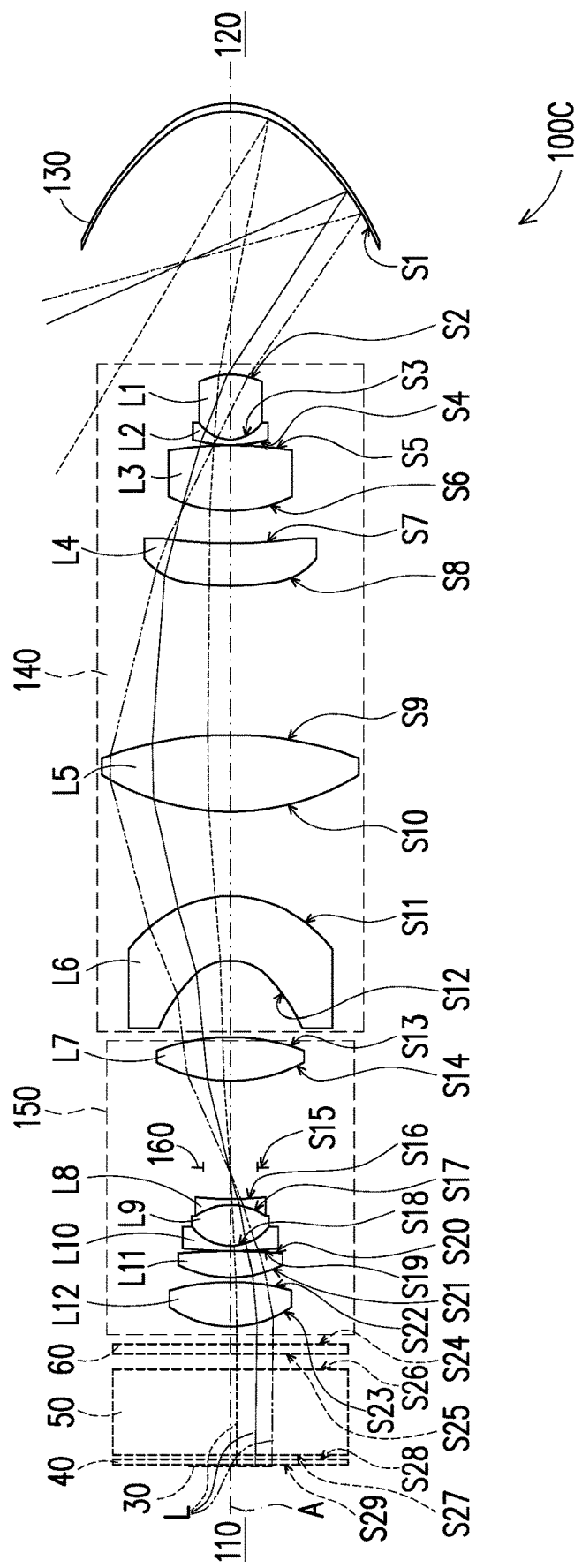
FIG. 9 is a schematic cross-sectional view of a projection lens according to a fourth embodiment of the invention.

FIG. 9 is a schematic cross-sectional view of a projection lens according to a fourth embodiment of the invention. Referring to FIG. 9, a projection lens 100C shown in FIG. 9 may be at least applied to the projector 10 shown in FIG. 1, and therefore the projector 10 applied to FIG. 1 is used as an example for description below, but the invention is not limited thereto. The projection lens 100C of the present embodiment is similar to the projection lens 100 shown in FIG. 2, and a main difference between both is that a lens closest to the minified side 110 in the lens group 140 of the projection lens 100B is an aspheric lens.

In the present embodiment, actual design of the foregoing elements may be shown in the following Table VII. An interpretation manner of the following table is the same as that of Table I, and the descriptions thereof are omitted herein.

TABLE VII

TL (mm) = 233.5; EFL (mm) = 2.2; TL/EFL = 106.1;
RF (mm) = 25.5; IMH (mm) = 8.945; RF/IMH = 2.9; F/# = 1.9;

| Element | Surface | Radius (mm) | Interval (mm) | Refractive index (Nd) | Abbe number (Vd) | Clear aperture (RF) |
|---|---|---|---|---|---|---|
| Concave mirror 130 | S1* | −18.53 | 50.63 |  |  | 63.3 |
| Lens L1 | S2 | −17.13 | 12.60 | 1.50 | 81.5 | 13.8 |
| Lens L2 | S3 | 9.73 | 1.00 | 1.63 | 35.70 | 14.1 |
|  | S4 | 32.12 | 0.20 |  |  | 16.1 |
| Lens L3 | S5 | −51.92 | 12.39 | 1.50 | 81.5 | 19.2 |
|  | S6 | 30.92 | 6.23 |  |  | 26.3 |
| Lens L4 | S7* | 1705.03 | 8.00 | 1.53 | 56.3 | 34.0 |
|  | S8* | −692.05 | 28.51 |  |  | 36.5 |
| Lens L5 | S9 | −82.83 | 14.61 | 1.64 | 55.40 | 54.1 |
|  | S10 | 58.05 | 15.72 |  |  | 54.8 |
| Lens L6 | S11* | −26.86 | 12.38 | 1.53 | 56.3 | 43.4 |
|  | S12* | −10.52 | 15.20 |  |  | 31.0 |
| Lens L7 | S13 | −55.31 | 8.48 | 1.64 | 55.40 | 31.5 |
|  | S14 | 35.34 | 16.73 |  |  | 31.2 |
| Aperture stop 160 | S15 | Infinity | 5.81 |  |  | 10.2 |
| Lens L8 | S16 | 70.73 | 1.00 | 1.60 | 38.00 | 13.5 |
| Lens L9 | S17 | −13.18 | 8.16 | 1.50 | 81.5 | 15.0 |
| Lens L10 | S18 | 11.54 | 1.00 | 1.70 | 30.10 | 16.3 |
|  | S19 | 88.24 | 0.20 |  |  | 19.7 |
| Lens L11 | S20 | −544.05 | 4.77 | 1.80 | 22.8 | 20.8 |
|  | S21 | 26.96 | 1.36 |  |  | 22.3 |
| Lens L12 | S22* | −42.36 | 8.52 | 1.51 | 64.0 | 24.6 |
|  | S23* | 19.17 |  |  |  | 25.5 |
| Transmissive smooth picture apparatus 60 | S24 | Infinity | 2 | 1.52 | 58.6 |  |
|  | S25 | Infinity | 3.2 |  |  |  |
| Prism 50 | S26 | Infinity | 16 | 1.73 | 28.3 |  |

TABLE VII-continued

TL (mm) = 233.5; EFL (mm) = 2.2; TL/EFL = 106.1;
RF (mm) = 25.5; IMH (mm) = 8.945; RF/IMH = 2.9; F/# = 1.9;

| Element | Surface | Radius (mm) | Interval (mm) | Refractive index (Nd) | Abbe number (Vd) | Clear aperture (RF) |
|---|---|---|---|---|---|---|
|  | S27 | Infinity | 0.8 |  |  |  |
| Glass cover 40 | S28 | Infinity | 1.1 | 1.51 | 62.9 |  |
|  | S29 | Infinity | 0.303 |  |  |  |

Referring to both FIG. 9 and Table VII, the lens L1 and the lens L2 form a compound lens, for example, doublet lens, and the lens L8, the lens L9, and the lens L10 form a compound lens, for example, triplet lens. The lens L4, the lens L6, and the lens L12 are aspheric lenses. In other words, the surface S1 of the concave mirror 130, the surface S7 and the surface S8 of the lens L4, the surface S11 and the surface S12 of the lens L6, and the surface S22 and the surface S23 of the lens L12 are aspheric surfaces. In addition, for the remaining optical characteristics and effects thereof, reference may be made to the description of the projection lens 100 in FIG. 1, and the descriptions thereof are omitted herein.

Table VIII below lists quadric coefficient values K and aspheric coefficients A-G of each order of the surface S1 of the concave mirror 130, the surface S7 and the surface S8 of the lens L4, the surface S11 and the surface S12 of the lens L6, and the surface S22 and the surface S23 of the lens L12.

TABLE VIII

| | S1 | S7 | S8 | S11 |
|---|---|---|---|---|
| K | −1.12 | 0 | 0 | −5.38 |
| A | 6.22E−06 | 5.17E−05 | 8.26E−05 | −2.56E−05 |
| B | −1.50E−08 | −2.44E−07 | −1.34E−07 | −2.09E−08 |
| C | 1.67E−11 | 4.99E−10 | 1.51E−10 | 1.55E−10 |
| D | −1.60E−14 | −4.19E−13 | −1.61E−13 | −3.40E−13 |
| E | 9.46E−18 | 0 | 0 | 4.48E−16 |
| F | −2.94E−21 | 0 | 0 | −2.29E−19 |
| G | 9.40E−26 | 0 | 0 | 0 |

| | S12 | S22 | S23 |
|---|---|---|---|
| K | −1.77 | 0 | 0 |
| A | −1.14E−04 | 1.92E−05 | −4.38E−05 |
| B | −1.62E−08 | 3.36E−08 | 1.35E−07 |
| C | 1.12E−09 | −7.73E−11 | −4.70E−10 |
| D | −1.78E−12 | 6.43E−13 | 1.08E−12 |
| E | 7.91E−16 | 0 | 0 |
| F | −1.06E−18 | 0 | 0 |
| G | 0 | 0 | 0 |

Figure 10:
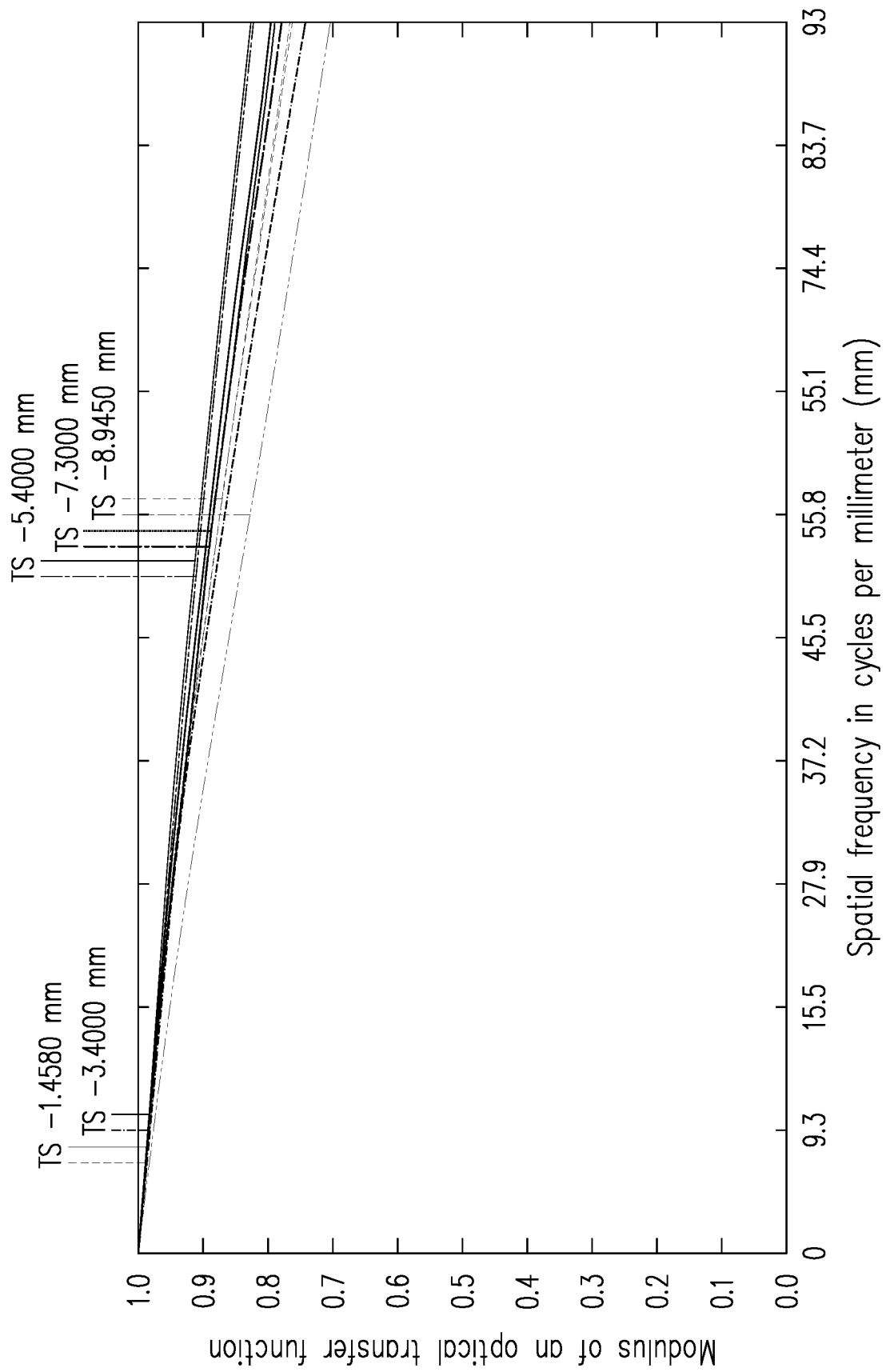
FIG. 10 is a graph showing optical imaging simulation data of the projection lens according to the fourth embodiment of the invention.

FIG. 10 is a graph showing imaging optical simulation data of the projection lens according to the fourth embodiment of the invention. Referring to FIG. 10, FIG. 10 is a modulation transfer function (MTF) curve graph of a projection lens 100C. An interpretation manner of FIG. 10 is the same as that of FIG. 3, and the descriptions thereof are omitted herein. As a result, it may be verified that the modulation transfer function curve displayed by the projection lens 100C of the present embodiment is within a standard range, and therefore the projection lens has good optical imaging quality, as shown in FIG. 10.

Figure 11:
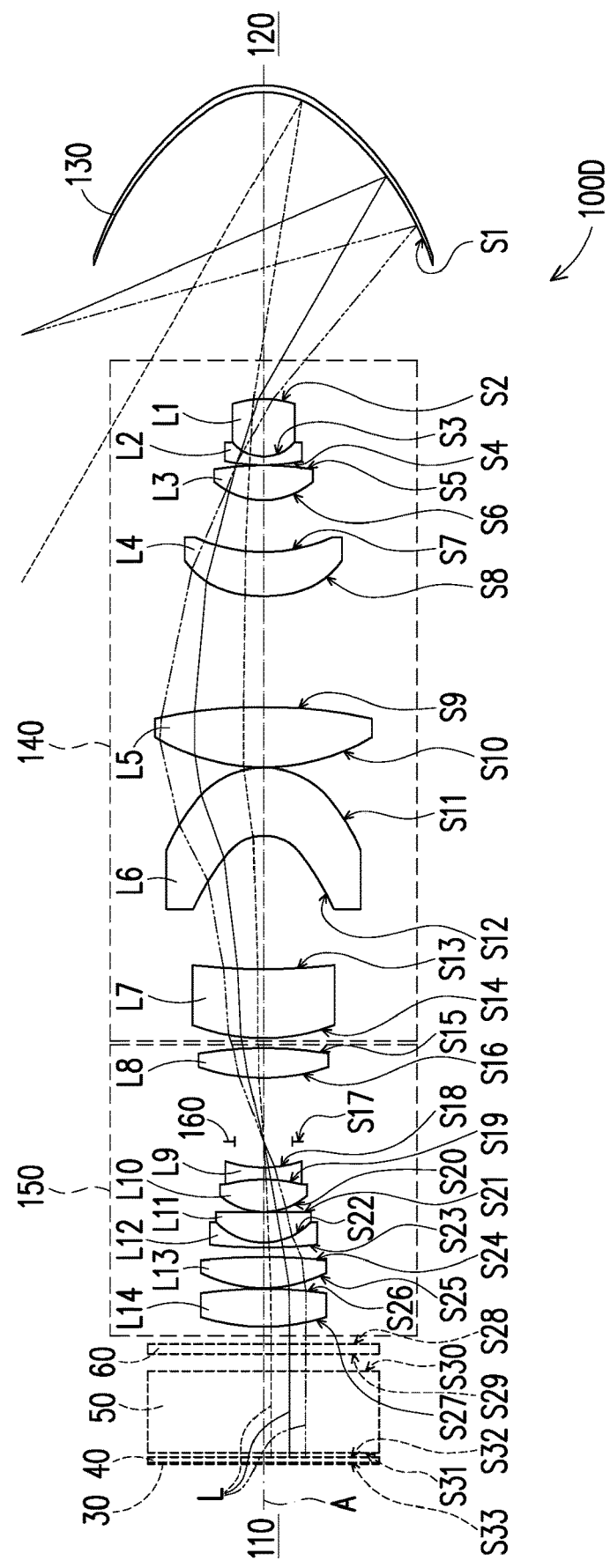
FIG. 11 is a schematic cross-sectional view of a projection lens according to a fifth embodiment of the invention.

FIG. 11 is a schematic cross-sectional view of a projection lens according to a fifth embodiment of the invention. Referring to FIG. 11, a projection lens 100D shown in FIG. 11 may be at least applied to the projector 10 shown in FIG. 1, and therefore the projector 10 applied to FIG. 1 is used as an example for description, but the invention is not limited thereto. The projection lens 100D of the present embodiment is similar to the projection lens 100 shown in FIG. 2, and a main difference between both is that a lens group 150 of the projection lens 100D has two sets of doublet lenses.

In the present embodiment, actual design of the foregoing elements may be shown in the following Table IX. An interpretation manner of the following table is the same as that of Table I, and the descriptions thereof are omitted herein.

TABLE IX

TL (mm) = 233.5; EFL (mm) = 2.2; TL/EFL = 106.1;
RF (mm) = 26.3; IMH (mm) = 8.945; RF/IMH = 2.9; F/# = 1.8;

| Element | Surface | Radius (mm) | Interval (mm) | Refractive index (Nd) | Abbe number (Vd) | Clear aperture (RF) |
|---|---|---|---|---|---|---|
| Concave mirror 130 | S1* | −19.75 | 58.06 |  |  | 72.4 |
| Lens L1 | S2 | −19.50 | 11.17 | 1.50 | 81.5 | 10.7 |
| Lens L2 | S3 | 8.96 | 1.44 | 1.63 | 35.7 | 13.6 |
|  | S4 | 39.59 | 0.20 |  |  | 16.2 |
| Lens L3 | S5 | −81.49 | 6.14 | 1.49 | 70.2 | 18.7 |
|  | S6 | 18.24 | 10.25 |  |  | 20.9 |
| Lens L4 | S7* | 44.27 | 8.00 | 1.53 | 56.3 | 30.1 |
|  | S8* | 62.23 | 20.78 |  |  | 33.9 |
| Lens L5 | S9 | −95.40 | 11.66 | 1.64 | 55.40 | 46.0 |
|  | S10 | 50.92 | 0.20 |  |  | 46.8 |
| Lens L6 | S11* | −17.39 | 12.60 | 1.53 | 56.3 | 41.5 |
|  | S12* | −9.12 | 25.64 |  |  | 29.6 |
| Lens L7 | S13 | 185.94 | 12.60 | 1.83 | 37.2 | 29.3 |
|  | S14 | 49.90 | 2.13 |  |  | 30.2 |
| Lens L8 | S15 | −85.6334 | 5.51 | 1.50 | 81.5 | 27.9 |
|  | S16 | 43.25 | 12.34 |  |  | 27.0 |
| Aperture stop 160 | S17 | Infinity | 5.30 |  |  | 11.5 |
| Lens L9 | S18 | 15.85 | 1.88 | 1.65 | 33.8 | 13.5 |
| Lens L10 | S19 | −43.54 | 5.78 | 1.50 | 81.5 | 16.3 |
|  | S20 | 15.96 | 0.20 |  |  | 18.1 |
| Lens L11 | S21 | 272.56 | 5.68 | 1.50 | 81.5 | 19.7 |
| Lens L12 | S22* | 16.30 | 1.10 | 1.76 | 27.5 | 20.6 |
|  | S23* | 95.53 | 1.68 |  |  | 23.0 |
| Lens L13 | S24 | −94.71 | 5.83 | 1.80 | 22.8 | 25.9 |
|  | S25 | 33.80 | 0.20 |  |  | 26.7 |
| Lens L14 | S26* | −53.65 | 7.13 | 1.51 | 64.0 | 26.3 |
|  | S27* | 45.97 |  |  | 25.9 |  |
| Transmissive smooth picture apparatus 60 | S28 | Infinity | 2 | 1.52 | 58.6 |  |
|  | S29 | Infinity | 3.2 |  |  |  |
| Prism 50 | S30 | Infinity | 16 | 1.73 | 28.3 |  |
|  | S31 | Infinity | 0.8 |  |  |  |
| Glass cover 40 | S32 | Infinity | 1.1 | 1.51 | 62.9 |  |
|  | S33 | Infinity | 0.303 |  |  |  |

Referring to both FIG. 11 and Table IX, the lens L1 and the lens L2, the lens L9 and the lens L10, and the lens L11 and the lens L12 form a compound lenses, for example, doublet lenses. The lens L4, the lens L6, and the lens L14 are aspheric lenses. In other words, the surface S1 of the concave mirror 130, the surface S7 and the surface S8 of the lens L4, the surface S11 and the surface S12 of the lens L6, and the surface S26 and the surface S27 of the lens L14 are aspheric surfaces. In addition, for the remaining optical characteristics and effects thereof, reference may be made to the description of the projection lens 100 in FIG. 1, and the descriptions thereof are omitted herein.

Table X below lists quadric coefficient values K and aspheric coefficients A-G of each order of the surface S1 of the concave mirror 130, the surface S7 and the surface S8 of the lens L4, the surface S11 and the surface S12 of the lens L6, and the surface S26 and the surface S27 of the lens L14.

TABLE X

|   | S1 | S7 | S8 | S11 |
|---|---|---|---|---|
| K | −1.19 | 0 | 0 | −1.52 |
| A | 5.66E−06 | 4.70E−05 | 7.00E−05 | −1.53E−05 |
| B | −1.43E−08 | −3.61E−07 | −5.10E−08 | −8.25E−08 |
| C | 1.74E−11 | 1.10E−09 | −1.71E−10 | 2.22E−10 |
| D | −1.62E−14 | −1.09E−12 | 5.83E−13 | −3.39E−13 |
| E | 9.46E−18 | 0 | 0 | 4.48E−16 |
| F | −3.14E−21 | 0 | 0 | −2.29E−19 |
| G | 4.09E−25 | 0 | 0 | 0 |

|   | S12 | S26 | S27 |
|---|---|---|---|
| K | −1.58 | 0 | 0 |
| A | −1.38E−04 | 2.01E−05 | −1.10E−05 |
| B | −8.37E−09 | 4.43E−08 | 7.93E−08 |
| C | 1.21E−09 | −1.00E−10 | −3.34E−10 |
| D | −1.80E−12 | −3.37E−14 | 3.32E−13 |
| E | 7.91E−16 | 0 | 0 |
| F | −1.06E−18 | 0 | 0 |
| G | 0 | 0 | 0 |

Figure 12:
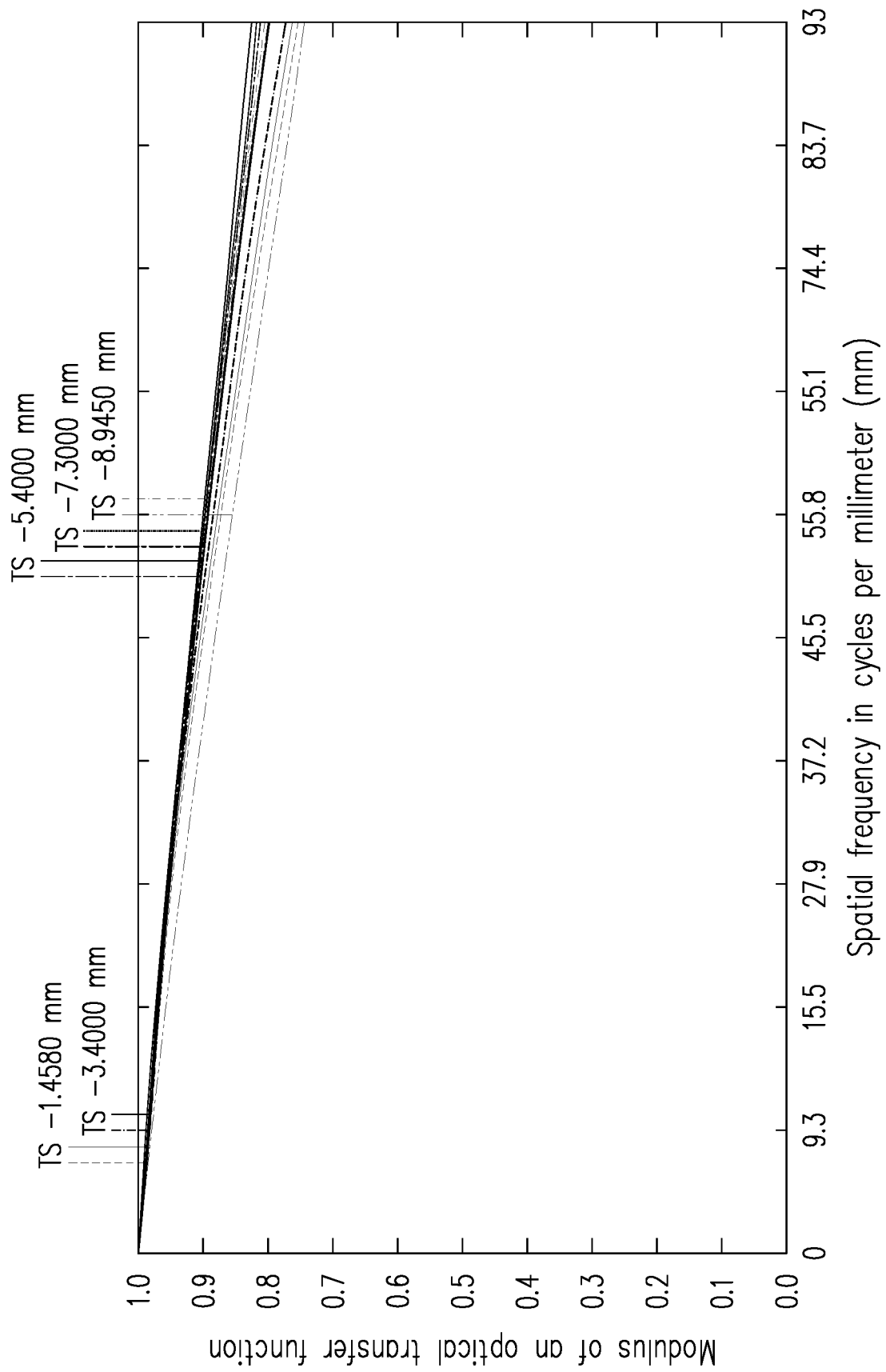
FIG. 12 is a graph showing optical imaging simulation data of the projection lens according to the fifth embodiment of the invention.

FIG. 12 is a graph showing imaging optical simulation data of the projection lens according to the fifth embodiment of the invention. Referring to FIG. 12, FIG. 12 is a modulation transfer function (MTF) curve graph of a projection lens 100D. An interpretation manner of FIG. 12 is the same as that of FIG. 3, and the descriptions thereof are omitted herein. Accordingly, it may be verified that the modulation transfer function curve displayed by the projection lens 100D of the present embodiment is within a standard range, and therefore the projection lens has good optical imaging quality, as shown in FIG. 12.

Figure 13A:
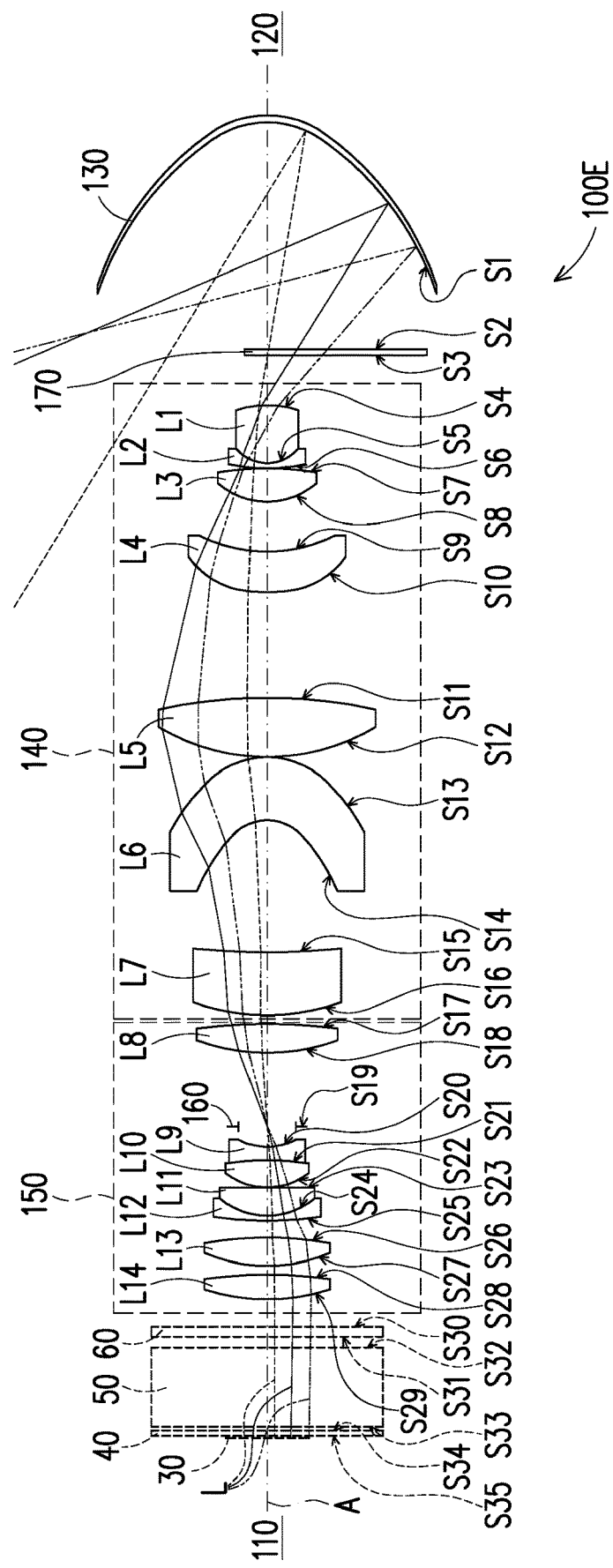
FIG. 13A is a schematic cross-sectional view of a projection lens according to a sixth lens of the invention.
Figure 13B:
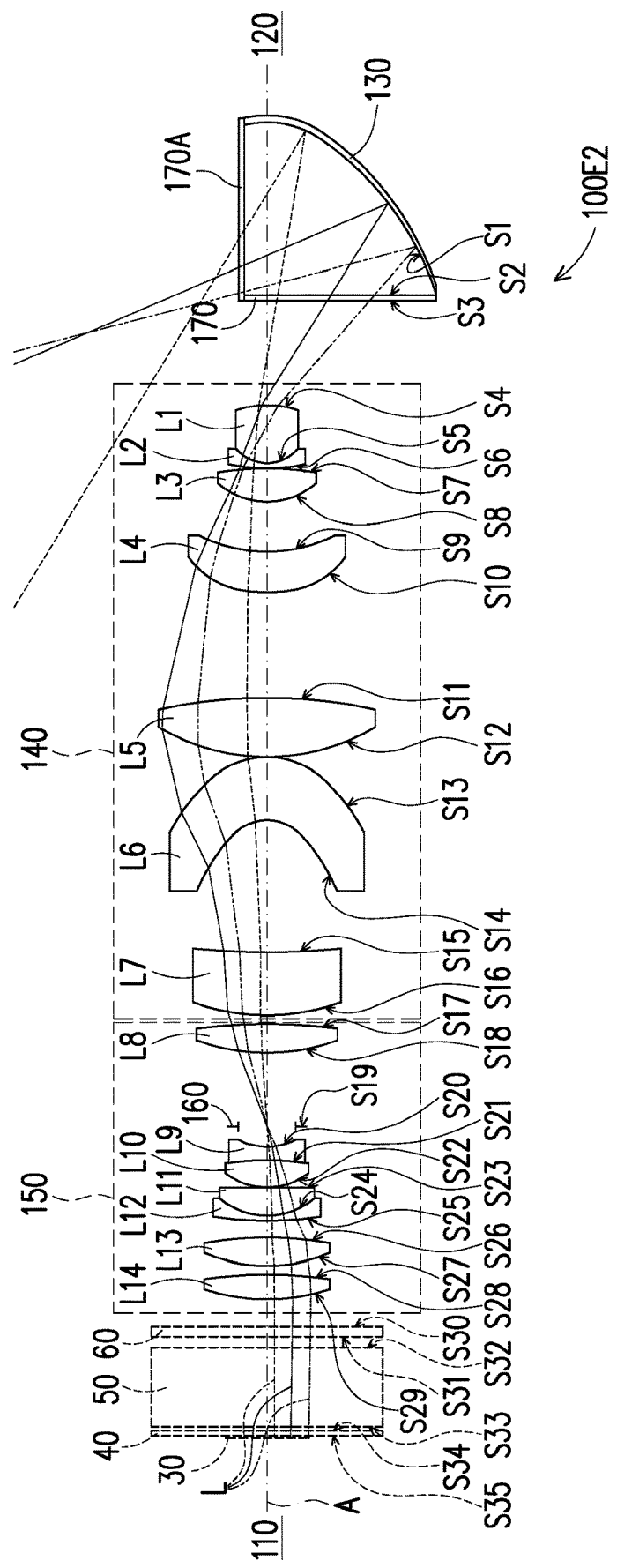
FIG. 13B is a schematic cross-sectional view of a projection lens according to a seventh embodiment of the invention.

FIG. 13A is a schematic cross-sectional view of a projection lens according to a sixth lens of the invention. FIG. 13B is a schematic cross-sectional view of a projection lens according to a seventh embodiment of the invention. Referring to FIG. 13A and FIG. 13B, a projection lens 100E shown in FIG. 13A may be at least applied to the projector 10 shown in FIG. 1, and therefore the projector 10 applied to FIG. 1 is used as an example for description below, but the invention is not limited thereto. The projection lens 100E of the present embodiment is similar to the projection lens 100 shown in FIG. 2, and a main difference between both is that a lens group 150 of the projection lens 100E has two sets of doublet lenses. The projection lens 100E further includes a glass cover 170, the glass cover 170 being located between the lens group 140 and the concave mirror 130. In an example of FIG. 13A, there is a reserved space between the glass cover 170 and the concave mirror 130, but a size and a position of the reserved space are only for illustration. Actually, the glass cover 170 may be translated and connected to the concave mirror 130 as required, and is big enough to cover an entire opening of the concave mirror 130 for dust prevention. In addition, during application, a design of the projection lens 100E2 shown in FIG. 13B may also be used. A difference is that the projection lens 100E2 translates the foregoing glass cover 170 to contact the concave mirror 130 to ensure that there is no space between the glass cover and the concave mirror. That is, the glass cover may be disposed at a side opening of the concave mirror 130. When the concave mirror 130 is cut off, an opening of the concave mirror 130 at a cutting side may further include another glass cover 170A to ensure that the dustproof effect is not affected, but the invention is not limited thereto. Cutting of the concave mirror 130 and the design of the glass covers 170, 170A described in FIG. 13A and FIG. 13B may be applied to the embodiments randomly.

In the present embodiment, actual design of the elements of the projection lens 100E shown in FIG. 13A may be shown in the following table XI. An interpretation manner of the following table is the same as that of Table I, and the descriptions thereof are omitted herein.

TABLE XI

TL (mm) = 237.2; EFL (mm) = 2.2; TL/EFL = 107.8;
RF (mm) = 26.7; IMH (mm) = 8.945; RF/IMH = 3.0; F/# = 1.8;

| Element | Surface | Radius (mm) | Interval (mm) | Refractive index (Nd) | Abbe number (Vd) | Clear aperture (RF) |
|---|---|---|---|---|---|---|
| Concave mirror 130 | S1 | −19.66 | 45.55 | | | 75.2 |
| Glass cover 170 | S2 | Infinity | 1.10 | 1.52 | 58.6 | 59.9 |
| | S3 | Infinity | 10.11 | | | 58.5 |
| Lens L1 | S4 | −19.27 | 11.78 | 1.50 | 81.5 | 10.4 |
| Lens L2 | S5 | 8.87 | 1.00 | 1.64 | 34.5 | 13.6 |
| | S6 | 36.25 | 0.20 | | | 16.1 |
| Lens L3 | S7 | −81.46 | 6.47 | 1.49 | 70.2 | 19.0 |
| | S8 | 17.59 | 10.14 | | | 21.3 |
| Lens L4 | S9 | 36.87 | 8.00 | 1.53 | 56.3 | 30.3 |
| | S10 | 46.59 | 21.40 | | | 34.1 |
| Lens L5 | S11 | −104.75 | 11.94 | 1.64 | 55.4 | 47.1 |
| | S12 | 50.53 | 0.20 | | | 48.0 |
| Lens L6 | S13 | −18.64 | 12.60 | 1.53 | 56.3 | 42.9 |
| | S14 | −9.78 | 26.55 | | | 31.2 |
| Lens L7 | S15 | 172.37 | 12.60 | 1.83 | 37.2 | 31.1 |
| | S16 | 50.19 | 2.12 | | | 32.3 |
| Lens L8 | S17 | −164.92 | 5.63 | 1.50 | 81.5 | 30.2 |
| | S18 | 41.26 | 14.73 | | | 29.5 |
| Aperture stop 160 | S19 | Infinity | 4.24 | | | 11.6 |
| Lens L9 | S20 | 15.46 | 2.69 | 1.65 | 33.8 | 13.0 |
| Lens L10 | S21 | −64.59 | 5.45 | 1.50 | 81.5 | 16.2 |
| | S22 | 16.07 | 0.20 | | | 18.0 |
| Lens L11 | S23 | 562.59 | 5.48 | 1.50 | 81.5 | 19.6 |
| Lens L12 | S24 | 17.19 | 1.03 | 1.76 | 27.5 | 20.4 |
| | S25 | 73.96 | 3.51 | | | 22.3 |
| Lens L13 | S26 | −88.85 | 5.44 | 1.80 | 22.8 | 26.5 |
| | S27 | 42.06 | 2.09 | | | 27.1 |
| Lens L14 | S28 | −59.86 | 4.95 | 1.51 | 64.0 | 26.7 |
| | S29 | 42.81 | | | | 26.6 |
| Transmissive smooth picture apparatus 60 | S30 | Infinity | 2.00 | 1.52 | 58.6 | |
| | S31 | Infinity | 3.20 | | | |
| Prism 50 | S32 | Infinity | 16.00 | 1.73 | 28.3 | |
| | S33 | Infinity | 0.80 | | | |
| Glass cover 40 | S34 | Infinity | 1.10 | 1.51 | 62.9 | |
| | S35 | Infinity | 0.30 | | | |

Referring to both FIG. 13A and Table XI, the lens L1 and the lens L2, the lens L9 and the lens L10, and the lens L11 and the lens L12 form compound lenses, for example, doublet lenses. The lens L4, the lens L6, and the lens L14 are aspheric lenses. In other words, the surface S1 of the concave mirror 130, the surface S9 and the surface S10 of the lens L4, the surface S13 and the surface S14 of the lens L6, and the surface S28 and the surface S29 of the lens L14 are aspheric surfaces. In addition, for the remaining optical characteristics and effects thereof, reference may be made to the description of the projection lens 100 in FIG. 1, and the descriptions thereof are omitted herein.

Quadric coefficient values K and aspheric coefficients A-G of each order of the surface S1 of the concave mirror 130, the surface S9 and the surface S10 of the lens L4, the surface S13 and the surface S14 of the lens L6, and the surface S28 and the surface S29 of the lens L14 are listed in Table XII below.

TABLE XII

|   | S1 | S9 | S10 | S13 |
|---|---|---|---|---|
| K | −1.20 | 0 | 0 | −1.34 |
| A | 5.28E−06 | 3.31E−05 | 5.28E−05 | −1.16E−05 |
| B | −1.43E−08 | −2.71E−07 | 1.54E−08 | −7.46E−08 |
| C | 1.76E−11 | 7.85E−10 | −3.15E−10 | 2.12E−10 |
| D | −1.64E−14 | −6.57E−13 | 6.96E−13 | −3.42E−13 |
| E | 9.46E−18 | 0 | 0 | 4.48E−16 |
| F | −3.01E−21 | 0 | 0 | −2.29E−19 |
| G | 3.44E−25 | 0 | 0 | 0 |

|   | S13 | S28 | S29 |
|---|---|---|---|
| K | −1.67 | 0 | 0 |
| A | −1.32E−04 | 2.09E−05 | −7.69E−06 |
| B | 3.22E−08 | 2.81E−08 | 5.41E−08 |
| C | 9.67E−10 | 9.92E−11 | −6.56E−11 |
| D | −1.49E−12 | −7.91E−13 | −4.97E−13 |
| E | 7.91E−16 | 0 | 0 |
| F | −1.06E−18 | 0 | 0 |
| G | 0 | 0 | 0 |

Figure 14:
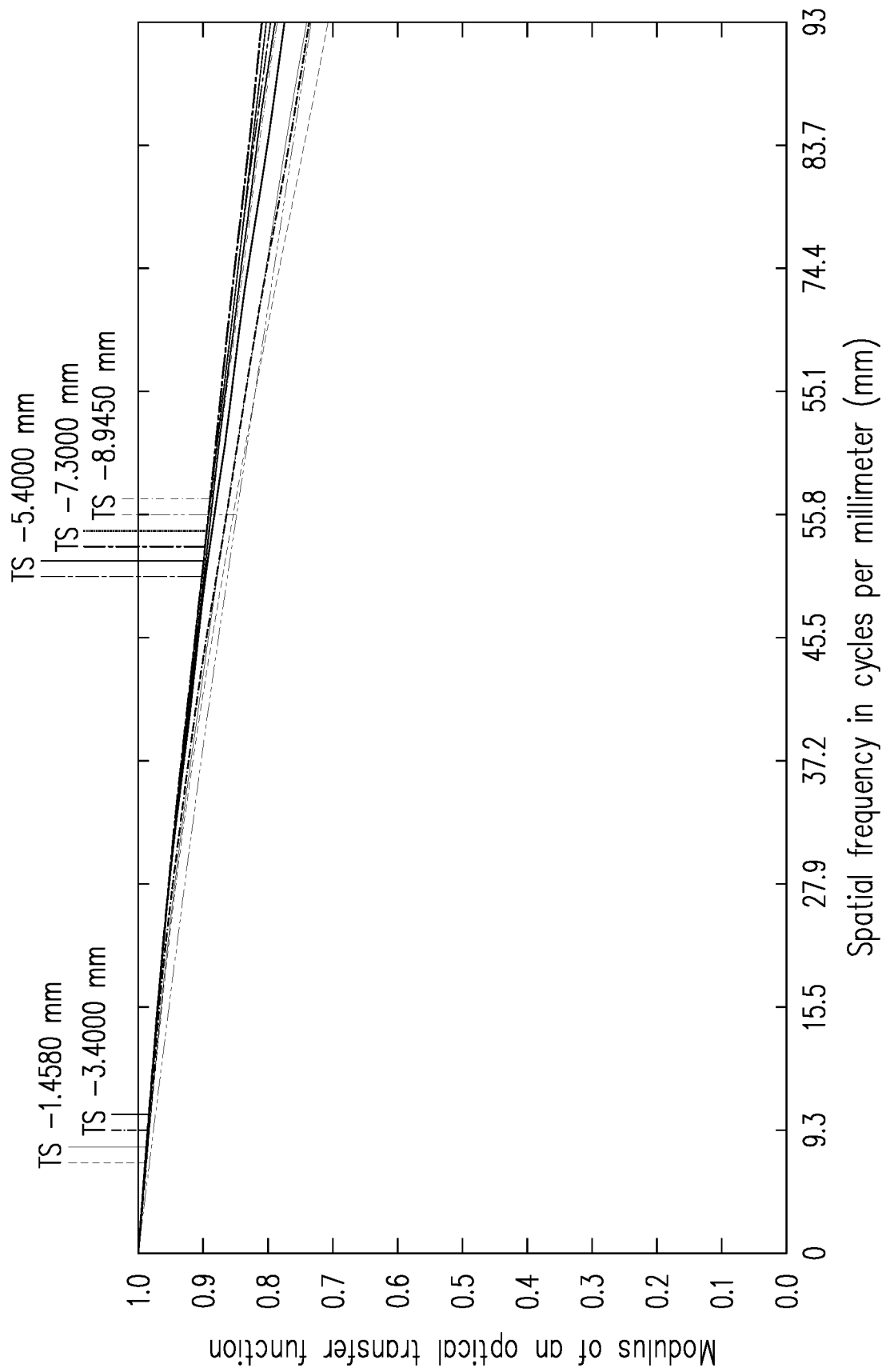
FIG. 14 is a graph showing optical imaging simulation data of the projection lens according to the sixth embodiment of the invention.

FIG. 14 is a graph showing imaging optical simulation data of the projection lens according to the sixth embodiment of the invention. Referring to FIG. 14, FIG. 14 is a modulation transfer function (MTF) curve graph of a projection lens 100E. An interpreting method of FIG. 14 is the same as that of FIG. 3, and repeated parts are omitted herein. Accordingly, it may be verified that the modulation transfer function curve displayed by the projection lens 100E of the present embodiment is within a standard range, and therefore the projection lens has good optical imaging quality.

Figure 15:
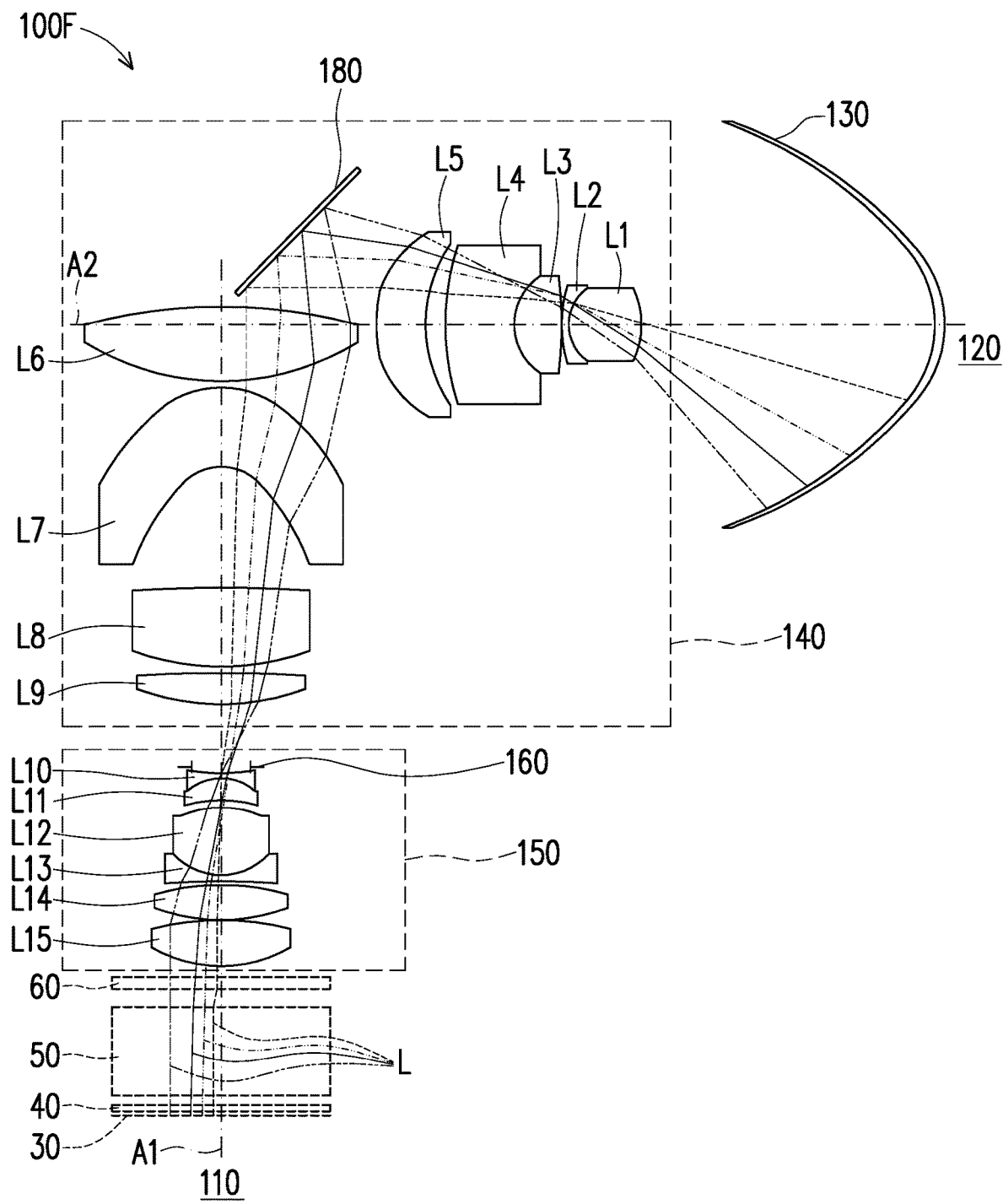
FIG. 15 is a schematic cross-sectional view of a projection lens according to an eighth embodiment of the invention.

FIG. 15 is a schematic cross-sectional view of a projection lens according to an eighth embodiment of the invention. Referring to FIG. 15, a projection lens 100F of the present embodiment is similar to the projection lens 100A shown in FIG. 5. A difference between both is that the projection lens 100F in the present embodiment further includes a reflective mirror 180. The reflective lens 180 is configured between a lens L5 and a lens L6 of a lens group 140 to turn a travel position of a light ray, but the invention is not limited thereto. In this way, the projection lens 100F may be adapted for different types of projectors, and the configured reflective mirror 180 may shorten a total length of the projection lens 100F.

The following table XIII is a parameter list of the embodiments.

TABLE XIII

|   | TL (mm) | EFL (mm) | TL/EFL | RF (mm) | IMH (mm) | RF/IMH |
|---|---|---|---|---|---|---|
| First embodiment | 233.5 | 2.2 | 106.1 | 26.9 | 8.9 | 3.0 |
| Second embodiment | 233.5 | 2.2 | 106.1 | 25.5 | 8.9 | 2.9 |
| Third embodiment | 233.5 | 2.2 | 106.1 | 25.7 | 8.9 | 2.9 |
| Fourth embodiment | 233.5 | 2.2 | 106.1 | 25.5 | 8.9 | 2.9 |
| Fifth embodiment | 233.5 | 2.2 | 106.1 | 26.3 | 8.9 | 2.9 |
| Sixth embodiment | 237.2 | 2.2 | 107.8 | 26.7 | 8.9 | 3.0 |

Based on the foregoing, the projection lens and the projector applying the projection lens in the embodiment of the invention may allow the light beam emitted by the light valve to pass through the optical axis three times and generate three times of imaging, and has relatively good optical quality under the requirements of a large aperture, low distortion, and low chromatic aberration.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A projection lens, comprising the following that are sequentially arranged from a minified side to a magnified side:
    a first lens, the first lens being a lens closest to the minified side in the projection lens;
    a second lens, an outer diameter of the second lens being less than an outer diameter of the first lens;
    an aperture stop;
    a third lens;
    a fourth lens;
    a fifth lens, an outer diameter of the fifth lens being greater than an outer diameter of the fourth lens;
    a sixth lens, the sixth lens being a lens closest to the magnified side in the projection lens, and an outer diameter of the sixth lens being less than the outer diameter of the fifth lens; and
    a concave mirror;
    wherein
    when the projection lens is focusing, the first lens, the second lens, the aperture stop, and the third lens are fixed relative to the concave mirror, and the fourth lens is capable of moving along an optical axis relative to the concave mirror, and
    the projection lens comprises 9 to 30 lenses with refractive power.

2. The projection lens according to claim 1, further comprising:
    a first lens group, comprising the first lens, the second lens, and the third lens; and
    a second lens group, comprising the fourth lens, the fifth lens, and the sixth lens.

3. The projection lens according to claim 2, wherein the first lens group and the second lens group have a same optical axis.

4. The projection lens according to claim 2 wherein the second lens group comprises 15 or fewer lenses with refractive power.

5. The projection lens according to claim 4, wherein the second lens group comprises at least two aspheric lenses.

6. The projection lens according to claim 5, wherein the projection lens is a fixed focal lens.

7. The projection lens according to claim 2, wherein a light beam starting from a center of a first image surface located at the minified side to a center of a second image surface at the magnified side, passes through an optical axis of the first lens group, an optical axis of the second lens group, or an optical axis of the concave mirror for a total of three times.

8. The projection lens according to claim 2, wherein the first lens group and the second lens group comprise two doublet lenses respectively.

9. The projection lens according to claim 1, further comprising:
    a seventh lens located between the fifth lens and the sixth lens, an outer diameter of the seventh lens being less than the outer diameter of the fifth lens, and the outer diameter of the seventh lens being greater than the outer diameter of the sixth lens, no lens being disposed between the fifth lens and the seventh lens, and a first intermediate image being formed between the fifth lens and the seventh lens.

10. The projection lens according to claim 9, wherein the projection lens is capable of forming a second intermediate image between the sixth lens and the concave mirror.

11. The projection lens according to claim 1, further comprising:
a seventh lens located between the fifth lens and the sixth lens, an outer diameter of the seventh lens being less than the outer diameter of the fifth lens and greater than the outer diameter of the sixth lens, no lens being disposed between the fifth lens and the seventh lens, and a light outputting end of the fifth lens and a light inputting end of the seventh lens are both non-telecentric.

12. The projection lens according to claim 1, wherein a TL is a distance from a surface of the first lens facing the minified side to the optical axis of the concave mirror on the projection lens, an EFL is an effective focal length of the projection lens, and the projection lens satisfies TL/EFL≥50.

13. The projection lens according to claim 1, wherein the minified side of the projection lens is telecentric.

14. A projection lens, comprising the following that are sequentially arranged from a minified side to a magnified side:
a first lens group, comprising a first lens, a second lens, an aperture stop, and a third lens that are sequentially arranged from the minified side to the magnified side, the first lens being a lens closest to the minified side in the first lens group, the first lens being an aspheric lens, and an outer diameter of the first lens being greater than an outer diameter of the second lens;
a second lens group, comprising a fourth lens, a fifth lens, and a sixth lens that are sequentially arranged from the minified side to the magnified side, the fourth lens being a lens closest to the minified side in the second lens group, the sixth lens being a lens closest to the magnified side in the second lens group, and an outer diameter of the fifth lens being greater than outer diameters of the fourth lens and the sixth lens; and
a concave mirror;
wherein
when the projection lens is focusing, the first lens group is fixed relative to the concave mirror, and the second lens group is capable of moving along an optical axis relative to the concave mirror, and
the projection lens comprises 9 to 30 lenses with refractive power.

15. The projection lens according to claim 14, further comprising:
a reflective mirror, being disposed between the fourth lens and the sixth lens of the second lens group.

16. A projector, comprising:
a light source;
a light valve disposed downstream of a light path of the light source;
a projection lens disposed downstream of a light path of the light valve, comprising the following that are sequentially arranged from a minified side to a magnified side:
a first lens group comprising a first lens, a second lens, an aperture stop, and a third lens that are sequentially arranged from the minified side to the magnified side, the first lens being a lens closest to the minified side in the first lens group, an outer diameter of the first lens being greater than an outer diameter of the second lens, and the outer diameter of the first lens being twice or more of a height of an image;
a second lens group, comprising a fourth lens, a fifth lens, and a sixth lens that are sequentially arranged from the minified side to the magnified side, the fourth lens being a lens closest to the minified side in the second lens group, the sixth lens being a lens closest to the magnified side in the second lens group, and an outer diameter of the fifth lens being greater than outer diameters of the fourth lens and the sixth lens; and
a concave mirror;
wherein
when the projection lens is focusing, the first lens group is fixed relative to the concave mirror, and the second lens group is capable of moving along an optical axis relative to the concave mirror, and
the projection lens comprises 9 to 30 lenses with refractive power.

17. The projector according to claim 16, wherein the first lens group and the second lens group have a same optical axis.

18. The projector according to claim 16, wherein the projection lens is a fixed focal lens, and the second lens group comprises 15 or fewer lenses with refractive power and at least two aspheric lenses.

19. The projector according to claim 16, wherein the projection lens further comprises a seventh lens located between the fifth lens and the sixth lens, an outer diameter of the seventh lens being less than the outer diameter of the fifth lens and greater than the outer diameter of the sixth lens, no lens being disposed between the fifth lens and the seventh lens, the projection lens is capable of forming a first intermediate image between the fifth lens and the seventh lens, and forming a second intermediate image between the sixth lens and the concave mirror.

20. The projector according to claim 16, wherein the projection lens further comprises a seventh lens located between the fifth lens and the sixth lens, an outer diameter of the seventh lens being less than the outer diameter of the fifth lens and greater than the outer diameter of the sixth lens, no lens being disposed between the fifth lens and the seventh lens, and a light outputting end of the fifth lens is non-telecentric.

21. The projector according to claim 16, wherein a light beam starting from a center of a first image surface located on the minified side to a center of a second image surface of the magnified side, passes through an optical axis of the first lens group, an optical axis of the second lens group, or an optical axis of the concave mirror for a total of three times.

22. The projection lens according to claim 16, wherein the projection lens satisfies TL/EFL≥50, wherein the TL is a distance between a surface facing the minified side of the first lens and the concave mirror along an optical axis of the projection lens, and the EFL being an effective focal length of the projection lens.

23. The projector according to claim 16, wherein the minified side of the projection lens is telecentric.

24. The projector according to claim 16, wherein the first lens group and the second lens group comprises two doublet lenses respectively.

* * * * *